US011027835B2

(12) United States Patent
Baek et al.

(10) Patent No.: US 11,027,835 B2
(45) Date of Patent: Jun. 8, 2021

(54) UNMANNED AERIAL VEHICLE

(71) Applicant: Samsung Electronics Co., Ltd, Suwon-si (KR)

(72) Inventors: Seung-Chul Baek, Hwaseong-si (KR); Wonhee Choi, Seoul (KR); Sang-In Baek, Suwon-si (KR); Min-Woo Yoo, Osan-si (KR); Byoung-Uk Yoon, Hwaseong-si (KR); Min-Sung Lee, Suwon-si (KR); Jong-Chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 15/965,617

(22) Filed: Apr. 27, 2018

(65) Prior Publication Data
US 2018/0319490 A1 Nov. 8, 2018

(30) Foreign Application Priority Data

May 4, 2017 (KR) .......................... 10-2017-0056824

(51) Int. Cl.
*B64C 27/48* (2006.01)
*B64C 39/02* (2006.01)
*B64C 11/02* (2006.01)

(52) U.S. Cl.
CPC .............. *B64C 27/48* (2013.01); *B64C 11/02* (2013.01); *B64C 39/024* (2013.01);
(Continued)

(58) Field of Classification Search
CPC ......... B64C 27/48; B64C 11/02; B64C 27/32; A63H 27/00
See application file for complete search history.

(56) References Cited

U.S. PATENT DOCUMENTS 4,318,455 A * 3/1982 Lapierre ................ A63H 29/18
                                                          185/39
8,430,709 B1 * 4/2013 Wong ..................... A63H 27/12
                                                          446/34
(Continued)

FOREIGN PATENT DOCUMENTS

FR          2422423 A1    11/1979
WO     2014/075609 A1     5/2014

OTHER PUBLICATIONS

European Search Report dated Jun. 27, 2018 in connection with European Patent Application No. EP 18 17 0427.

*Primary Examiner* — Richard G Davis

(57) ABSTRACT

An unmanned aerial vehicle according to various embodiments includes: a housing; a communication circuit, wherein the communication circuit establishes wireless communication with an external controller; and a plurality of propulsion systems connected to the housing, wherein the propulsion systems include: a motor; a rotation shaft having an axis extending in a first direction, wherein a first end is connected to the motor, and wherein the rotation shaft is rotates in a first direction by the motor; a cap structure fixed to the second end of the rotation shaft, a propeller including: a hub including a through-hole formed in the first direction, such that the rotation shaft rotatably passes through the through-hole, wherein the propeller is detachably connected to the cap structure, such that, when an external force is exerted on the blade, the propeller is released from the cap structure to be freely movable along the axis toward the motor.

7 Claims, 43 Drawing Sheets

(52) U.S. Cl.
CPC .. *B64C 2201/027* (2013.01); *B64C 2201/042* (2013.01); *B64C 2201/108* (2013.01)

(56) References Cited

U.S. PATENT DOCUMENTS

| | | | | |
|---|---|---|---|---|
| 2010/0120321 | A1 | 5/2010 | Rehkemper et al. | |
| 2012/0177497 | A1* | 7/2012 | Huang | A63H 27/02 |
| | | | | 416/204 R |
| 2014/0314565 | A1* | 10/2014 | Ghapgharan | H02K 7/003 |
| | | | | 416/1 |
| 2014/0356174 | A1* | 12/2014 | Wang | A63H 27/02 |
| | | | | 416/204 R |
| 2016/0016654 | A1 | 1/2016 | Wang et al. | |
| 2018/0266251 | A1* | 9/2018 | Muren | A63H 27/12 |
| 2019/0100301 | A1* | 4/2019 | Hu | B64C 27/32 |
| 2019/0193834 | A1* | 6/2019 | Deng | B64C 27/32 |

* cited by examiner

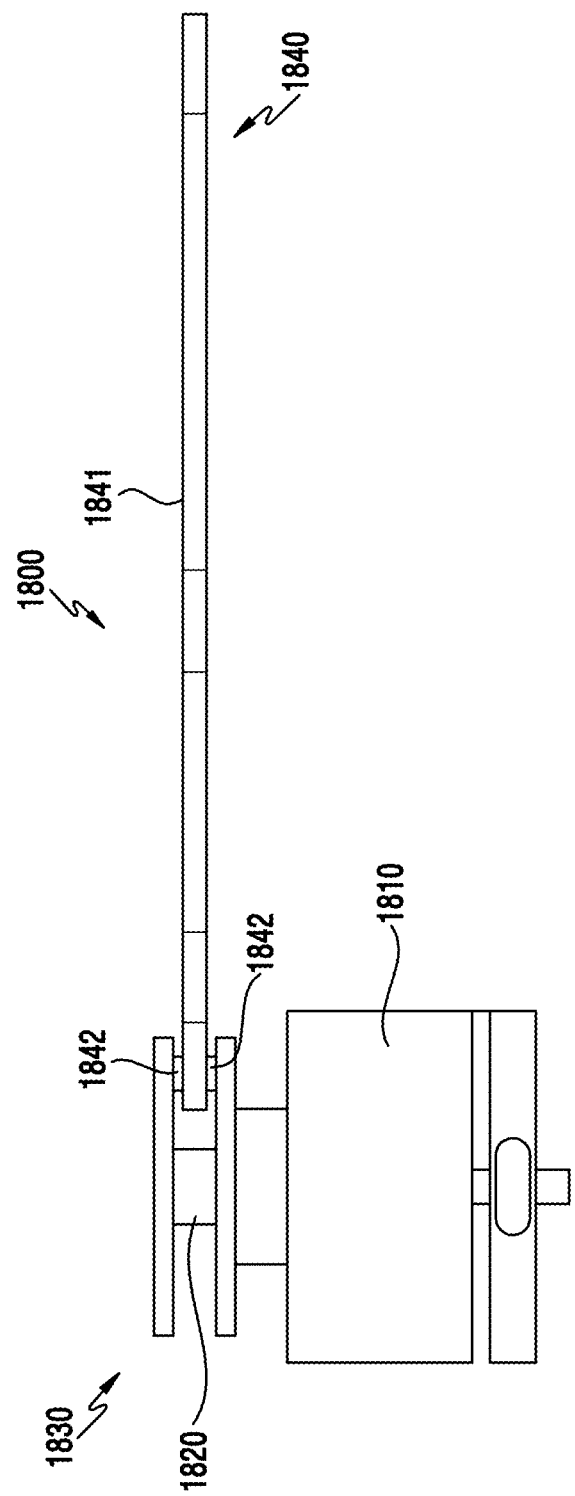

UNMANNED AERIAL VEHICLE

CROSS-REFERENCE TO RELATED APPLICATION(S)

This application is based on and claims priority under 35 U.S.C. § 119 to Korean Patent Application No. 10-2017-0056824 filed on May 4, 2017, in the Korean Intellectual Property Office, the disclosure of which is incorporated by reference herein in its entirety.

TECHNICAL FIELD

The present disclosure relates to an unmanned aerial vehicle.

BACKGROUND

The above information is presented as background information only to assist with an understanding of the present disclosure. No determination has been made, and no assertion is made, as to whether any of the above might be applicable as prior art with regard to the present disclosure.

An unmanned aerial vehicle (or a drone) is an aerial vehicle that can be automatically flown through remote control without a person in the aerial vehicle. An unmanned aerial vehicle does not have a specific space for a person, so size and weight reduction is possible. Accordingly, unmanned aerial vehicles have been developed and used for military operations such as a reconnaissance unmanned aerial vehicle for collecting information on places that people have difficulty in approaching or reconnoitering the places, but, recently, unmanned aerial vehicles have been given a photographing function and are popularized and used for leisure.

As unmanned aerial vehicles are popularized, the possibility of safety accidents associated with the unmanned aerial vehicle is increased in the everyday life of people. Unmanned aerial vehicles include propellers that are rotated at a high speed. When the propellers that are rotated at a high speed hit a person or an obstacle in operation, the person may be injured or the obstacle may be damaged, and the propellers may also be damaged. For example, when a propeller that is being rotated at a high speed directly hits a person, it may deeply injure the skin and muscles of the person.

In order to secure safety against the propellers that are rotated at a high speed, unmanned aerial vehicle may be equipped with safety guards partially or entirely surrounding the propellers. However, the flying performance of an unmanned aerial vehicle equipped with such a safety guard may be deteriorated. For example, when the top and bottom of a propeller is protected by a mechanical structure such as a net, the mechanical structure interferes with the flow of air and increases the weight of an unmanned aerial vehicle, so the performance such as flying time/ability may be deteriorated.

SUMMARY

Various embodiments provide safe propulsion systems for an unmanned aerial vehicle.

Various embodiments may provide a safe unmanned aerial vehicle, the unmanned aerial vehicle including: a housing; a wireless communication circuit positioned inside or connected to the housing, wherein the communication circuit is configured to establish wireless communication with an external controller; a plurality of propulsion systems connected to or at least partially embedded in the housing; and a navigation circuit configured to control the propulsion systems, wherein at least one of the plurality of propulsion systems includes: a motor controlled by the navigation circuit; a rotation shaft having an axis extending in a first direction, and including a first end and a second end, wherein the first end is connected to the motor, and wherein the rotation shaft is configured to be rotated in a first rotational direction by the motor; a cap structure fixed to the second end of the rotation shaft, a propeller including: a hub including a through-hole formed in the first direction, such that the rotation shaft rotatably passes through the through-hole; and a plurality of blades connected to the hub in second directions substantially perpendicular to the first direction, wherein the propeller is detachably fixed to or connected to the cap structure, such that, when an external force is exerted on at least one of the blades, the propeller is released from the cap structure to be freely movable along the axis toward the motor.

Various embodiments may provide a propulsion system according including: a motor; a rotation shaft having a first end and a second end connected to the motor and extending in a first direction to be rotated in a first rotational direction by the motor; a cap structure fixed to the second end of the rotation shaft; and a propeller including a hub having a through-hole formed in the first direction such that that rotation shaft can be rotated therein, and a plurality of blades connected to the hub in a second direction substantially perpendicular to the first direction, wherein the propeller may be configured to be fixed or connected to the cap structure, and to be separated from the cap structure by rotating in a second rotational direction opposite to the first rotational direction relative to the cap structure when rotation of the blades is stopped by an external force.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18A is a front view of a propulsion system further including guide rails according to various embodiments.

DETAILED DESCRIPTION

Figure 1:
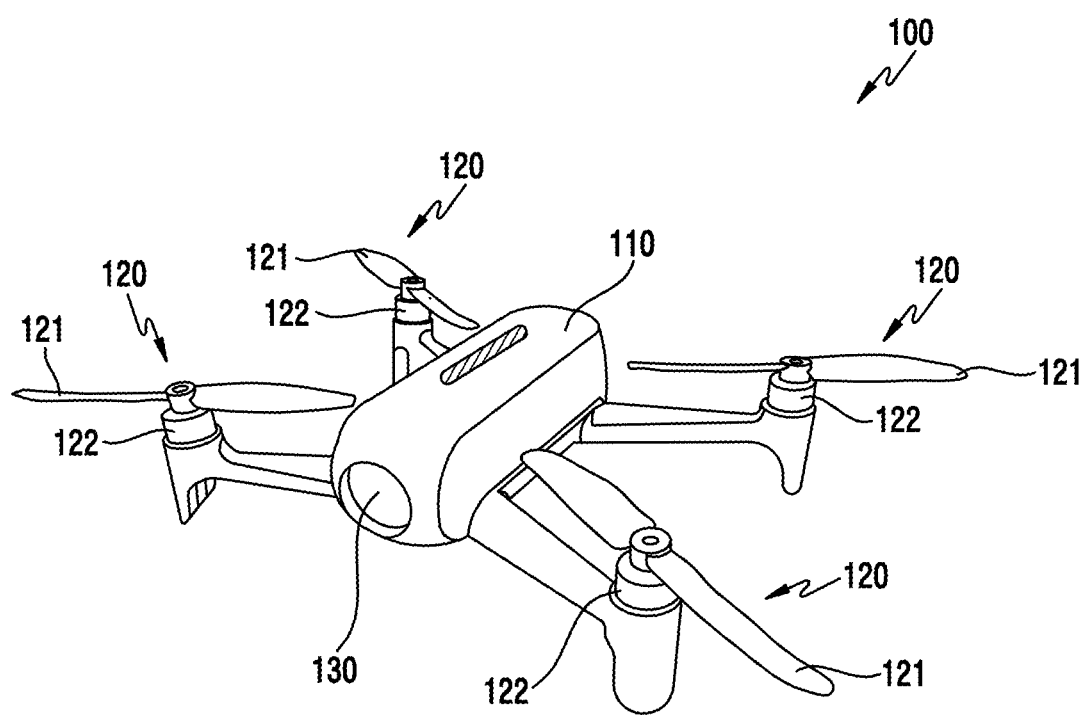
FIG. 1 is a perspective view showing the configuration of an unmanned aerial vehicle according to an embodiment.

FIGS. 1 through 19B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. However, it should be understood that there is no intent to limit the present disclosure to particular forms, and the present disclosure should be construed to cover all modifications, equivalents, and/or alternatives falling within the spirit and scope of the embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, "A or B," "at least one of A and B," or "at least one of A or B" may refer to all cases of (1) including at least one A, (2) including at least one B, or (3) including both at least one A and at least one B.

The expressions "a first," "a second," "the first," "the second," and the like, used in various embodiments, may modify various elements irrespective of order and/or importance thereof and do not limit the corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV®), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, various embodiments will be described in detail with reference to the accompanying drawings. However, components may be exaggerated or reduced in size for the convenience of description. For example, the sizes and thicknesses of the components shown in the figures are selectively provided and the present disclosure is not necessarily limited thereto.

Further, a rectangular coordinate system is used therein, in which the x-axis indicates the transverse direction of an electronic device, the y-axis indicates the longitudinal axis of the electronic device, and the z-axis indicates the thickness direction of the electronic device. However, the x-axis, y-axis, and z-axis are not limited to three axes of a rectangular coordinate system and may be construed as wider meaning including them. For example, the x-axis, y-axis, and z-axis may be perpendicular to each other, but may indicate other directions not perpendicular to each other.

FIG. 1 is a perspective view showing the configuration of an unmanned aerial vehicle according to an embodiment. Referring to FIG. 1, an unmanned aerial vehicle 100 according to various embodiments may include a housing 110 and a plurality of propulsion systems 120.

According to various embodiments, the propulsion system 120 provides a thrust to the unmanned aerial vehicle 100 and can enable the unmanned aerial vehicle 100 to fly. According to various embodiments, the propulsion systems 120 each may include a propeller 121 and a motor 122 configured to rotate the propeller 121. The propeller 121 can change torque from the motor 122 into a thrust. In other words, the unmanned aerial vehicle 100 can fly using thrusts generated by the propellers 121. The propulsion system 120 may be referred to as an aerial actuator or a propeller assembly.

According to various embodiments, the housing may include a communication unit (or a wireless communication circuit) connected to or disposed in the housing, a controller (or a navigation circuit), a sensor unit, and an imaging device 130.

According to an embodiment, the communication unit can establish wireless communication with an external controller (or a remote controller) for controlling the unmanned aerial vehicle 100. The communication unit can receive control signals from the external controller for controlling the unmanned aerial vehicle 100. The communication unit can transmit information about a flying state of the unmanned aerial vehicle 100 to the remote controller.

According to an embodiment, the controller can control motions of the unmanned aerial vehicle 100 by operating the propulsion systems 120 in response to control signals received from the remote controller through the communication unit.

According to an embodiment, the sensor unit may include a gyro sensor that can measure an angular velocity of the unmanned aerial vehicle 100 in flight, a barometer that can measure a change in pressure of the air and/or atmospheric pressure, a magnetic sensor (a terrestrial magnetism sensor, a compass sensor) that can measure the magnetism of the earth, an acceleration sensor that measures the acceleration of an aerial vehicle, a proximity sensor that measures the approach of an object and the distance from an object (including an ultrasonic sensor that can measure a distance by measuring a signal reflected from an object by radiating ultrasonic waves), an optical sensor (Optical Flow (OFS)) that can find out locations by recognizing the configurations or patterns of the ground, etc. The sensor unit can calculate the posture of the unmanned aerial vehicle 100.

According to an embodiment, the imaging device 130 may be mounted on or disposed in the housing 110. The imaging device 130 may be implemented in various ways to take still images or moving images.

Figure 2:
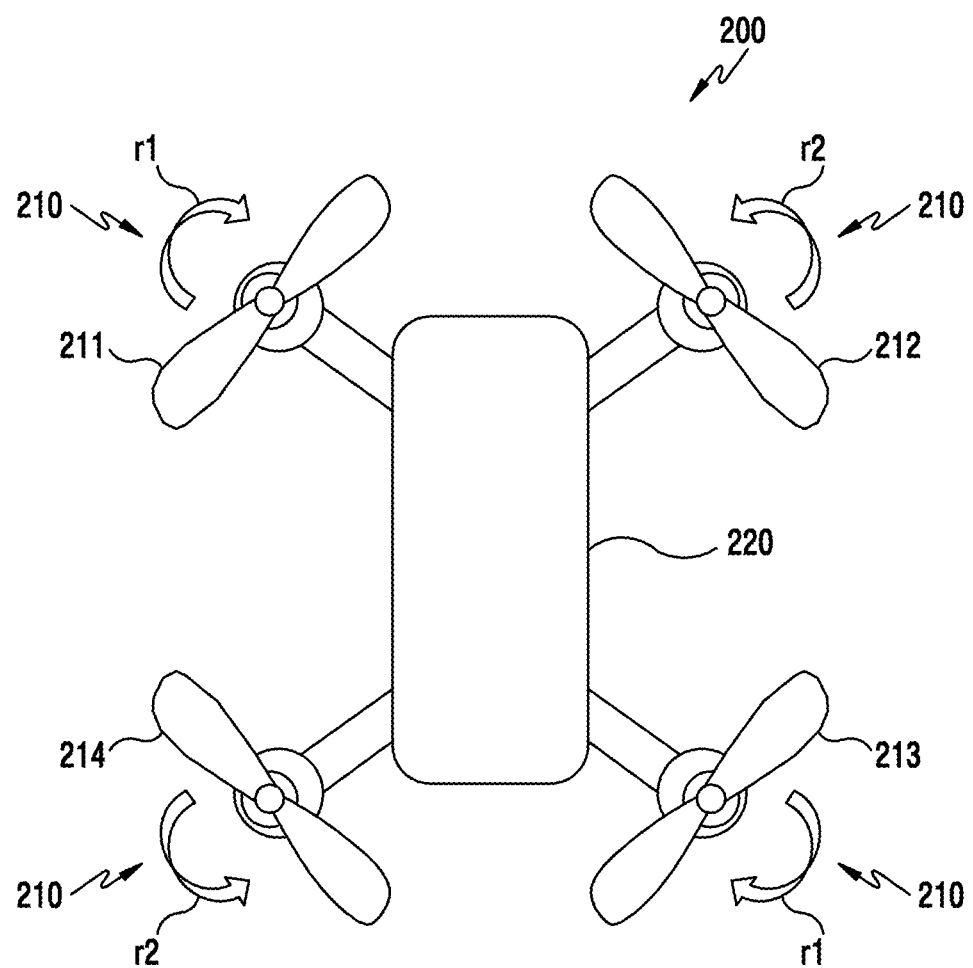
FIG. 2 is a plan view showing an unmanned aerial vehicle according to various embodiments.

FIG. 2 is a plan view showing an unmanned aerial vehicle according to various embodiments. Referring to FIG. 2, an unmanned aerial vehicle 200 according to various embodiments may include a plurality of, for example, four propulsion systems 210. The propulsion systems 210 may be symmetrically arranged with a housing 220 therebetween. For example, in the propulsion systems 210, a first propeller 211 may be disposed to be adjacent to a second propeller 212 and a fourth propeller 214 and to face a third propeller 213 with the housing 220 therebetween. In other words, the second propeller 212 may be disposed to be adjacent to the first propeller 211 and the third propeller 213 and to face the fourth propeller 214 with the housing 220 therebetween.

In the unmanned aerial vehicle 200 according to an embodiment, the propellers of the propulsion systems 210 facing each other may be rotated in the same direction and propellers adjacent to each other may be rotated in opposite directions. For example, the first propeller 211 and the third propeller 213 may be rotated in a first rotational direction r1 that is the clockwise direction, and the second propeller 212 and the fourth propeller 214 may be rotated in a second rotational direction r2 that is the counterclockwise direction. Alternatively, the first propeller 211 and the third propeller 213 may be rotated in the second rotational direction r2, and the second propeller 212 and the fourth propeller 214 may be rotated in the first rotational direction r1. The reason that the rotational directions of the propellers are different is for conserving angular momentum. If all the four propellers are rotated in the same direction, the unmanned aerial vehicle 200 may be inclined only in one direction without keeping the balance. That is, unmanned aerial vehicle 200 can stably fly while preventing abnormal rotation, using the propellers having different rotational directions. Accordingly, the propellers 211, 212, 213, and 214 of the propulsion systems 210 can be configured to have different rotational directions. Alternatively, the motors that operate the propellers 211, 212, 213, and 214 may be configured to have different rotational directions.

According to various embodiments, the unmanned aerial vehicle 200 may include all of a tri-rotor having three propellers (or propulsion systems), a quad-rotor having four propellers, a penta-rotor having five propellers, a hexa-rotor having six propellers, an octa-rotor having eight propellers, etc. A quad-rotor was exemplified in the above description, but the unmanned aerial vehicle 200 is not limited thereto, and the number, configuration, and rotational direction of the propellers may be changed in various ways.

Figure 3A:
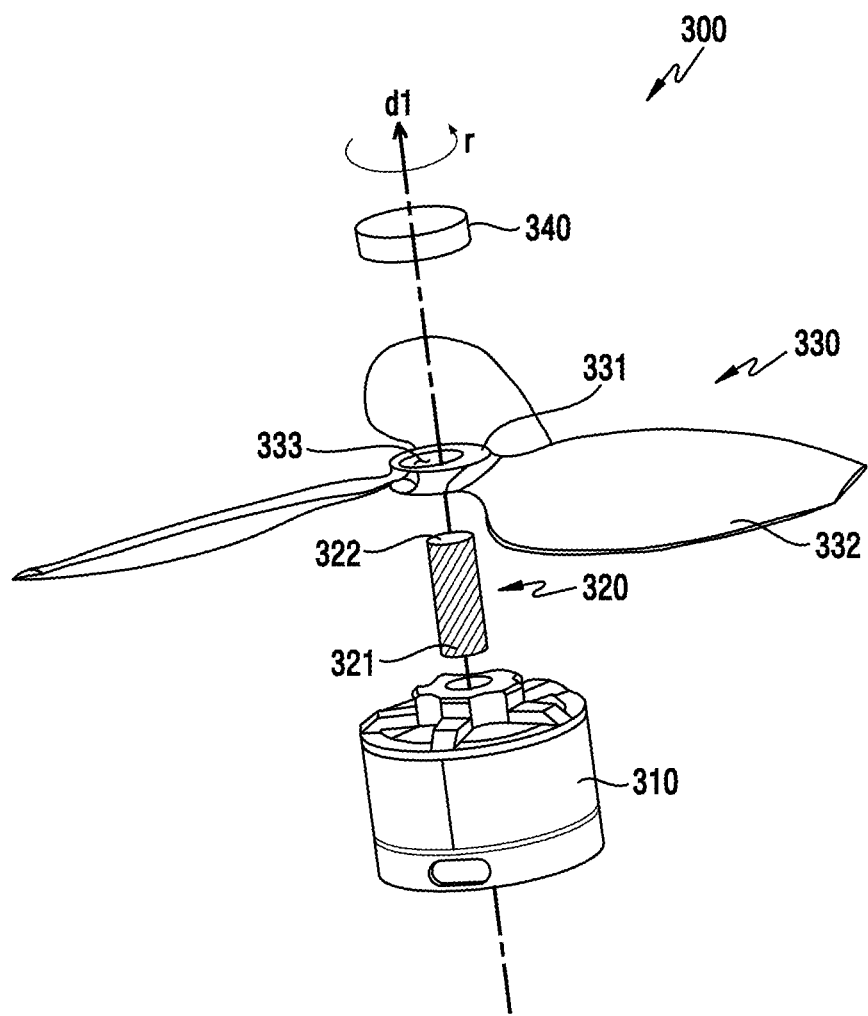
FIG. 3A is an exploded view of a propulsion system according to various embodiments.
Figure 3B:
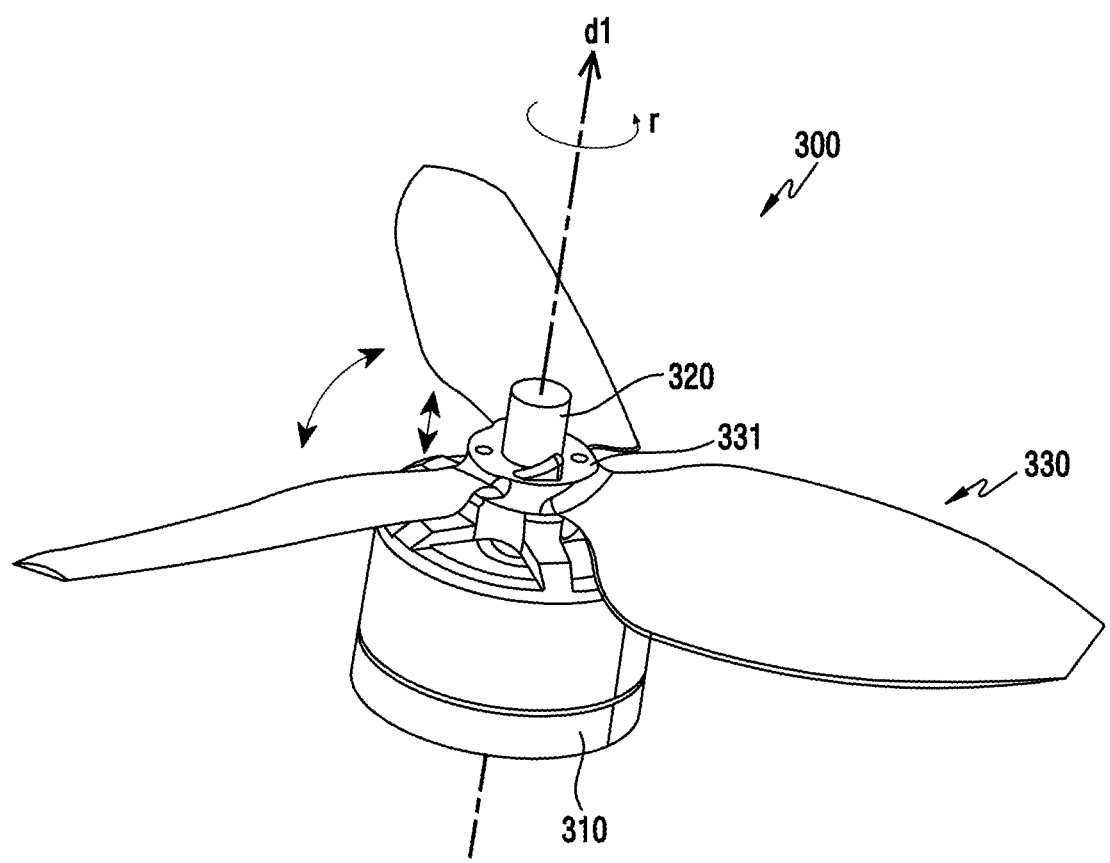
FIG. 3B is a view showing the propulsion system with a motor, a rotation shaft, and a propeller assembled according to various embodiments.
Figure 3C:
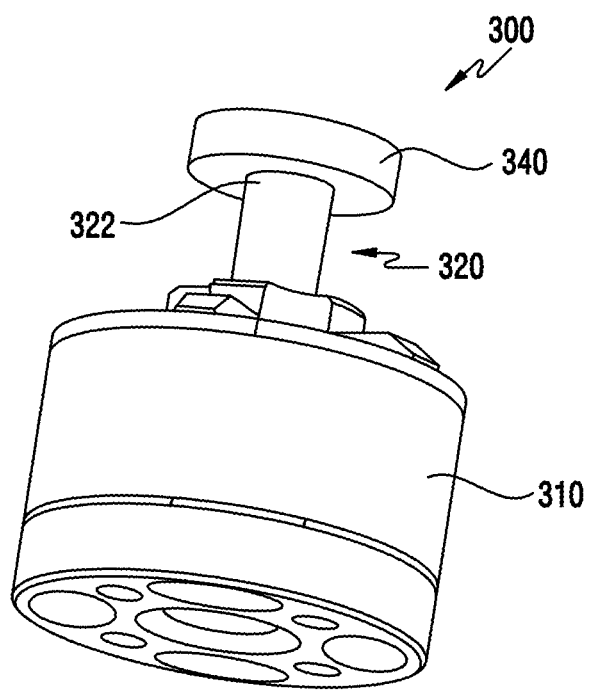
FIG. 3C is a view of the propulsion system with the motor, the rotation shaft, and a cap structure assembled according to various embodiments.
Figure 3D:
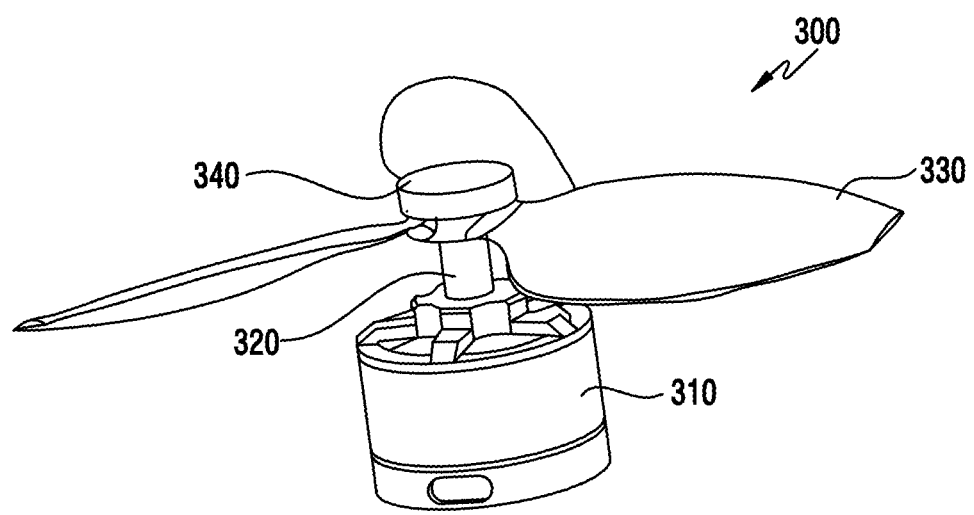
FIG. 3D is a perspective view showing the propulsion system completely assembled, according to various embodiments.

FIG. 3A is an exploded view of a propulsion system according to various embodiments. FIG. 3B is a view showing the propulsion system with a motor, a rotation shaft, and a propeller assembled according to various embodiments. FIG. 3C is a view of the propulsion system with the motor, the rotation shaft, and a cap structure (or, simply 'cap') assembled according to various embodiments. FIG. 3D is a perspective view showing a propulsion system 300 completely assembled, according to various embodiments; A propulsion system according to various embodiments is described with reference to FIGS. 3A to 3D. A propulsions system 300 shown in FIGS. 3A to 3D may constitute the propulsion systems 210 shown in FIG. 2.

Referring to FIG. 3A, the propulsion system 300 according to various embodiments may include a motor 310, a rotation shaft 320, a propeller 330, and a cap structure 340.

According to an embodiment, the rotation shaft 320 may be configured to be rotated in a rotational direction r by the motor 310. For example, the rotation shaft 320 may have rod shape having a first end 321 and a second end 322 and extending in a first direction d1 (hereafter, the first direction may be defined as an axial direction). The first end 321 of the rotation shaft 320 may be connected to the motor 310. In an embodiment, the first end 321 of the rotation shaft 320 may be directly connected to the motor 310, so torque from the motor 310 can be directly applied to the rotation shaft 320. In another embodiment, the first end 321 of the rotation shaft 320 may be connected to the motor 310 indirectly (for example, through a gear box), so torque from the motor 310 can be indirectly applied to the rotation shaft 320. Accordingly, the rotation shaft 320 may be configured to be rotated in the rotational direction r by the motor 310.

According to an embodiment, the propeller (or rotor) 330 may include a hub 331 and a plurality of blades 332. The blades 332 may be connected to the side of the hub 331 with regular circumferential intervals. The blades 332 may indicate wings with a wing angle. According to some embodiment, the blade 332 may be referred to as a propeller wing or a propeller blade. In the propeller 330, the hub 331 and the blades 332 may be integrally formed, or the hub 331 and the blades 332 may be combined.

Referring to FIG. 3B, the propeller 330 according to various embodiments may be combined with the rotation shaft 320 to be freely rotatable. For example, the hub 331 may have a through-hole 333 at the center. The propeller 330 may be combined such that the rotation shaft 320 is inserted through the through-hole 333. The through-hole 333 may be larger in radius than the rotation shaft 320. Accordingly, the propeller 330 can be freely moved in the axial direction d1 or freely rotated in the rotational direction r without be confined by the rotation shaft 320.

Referring to FIG. 3C, the cap structure 340 according to various embodiments may be fixedly coupled to the second end 322 of the rotation shaft 320. The cap structure 340 may be configured to hold the propeller 330 to prevent the propeller 330 from being separated from the rotation shaft 320 in the axial direction d1. Accordingly, the cap structure 340 may be referred to as a holder. The fixed coupling of the rotation shaft 320 and the cap structure 340 may be made by thread-fastening, snap-fitting, bonding, etc. that prevent them from being separated while the propulsion system 300 is normally operated.

Referring to FIG. 3D, the propeller 330 according to various embodiments may be detachably fixed or connected to the cap structure 340. For example, the cap structure 340 and the propeller 330 may have an axial anti-free movement structure (a first mechanism) that fixes the propeller 330 by restricting movement in the axial direction d1. The cap structure 340 connected to the propeller 330 can apply the torque transmitted from the motor 310 through the rotation shaft 320 to the propeller 330. For example, the cap structure 340 and the propeller 330 may further have an anti-free rotation structure (a second mechanism) that fixes the propeller 330 by restricting rotation in the axial direction d1. The first and second mechanisms may be configured to separate the cap structure 340 and the propeller 330 from each other in a predetermined situation.

According to various embodiments, the sequence of assembling the propulsion system 300 is as follows. As a first step, the motor 310 and the rotation shaft 320 may be assembled. The first end 321 of the rotation shaft 320 may be connected to the motor 310 to receive torque from the motor 310. As a second step, the propeller 330 may be coupled to the rotation shaft 320. The propeller 330 may be assembled in a manner of inserting the rotation shaft 320 into the through-hole 333 of the hub 331. As a third step, the cap structure 340 and the rotation shaft 320 may be assembled. The cap structure 340 may be completely fixedly coupled to the second end 322 of the rotation shaft 320. As a fourth step, the propeller 330 may be assembled to be fixed to the cap structure 340. The propeller 330 assembled with the cap structure 340 may be retained not to be freely moved or rotated by the cap structure 340.

Figure 4A:
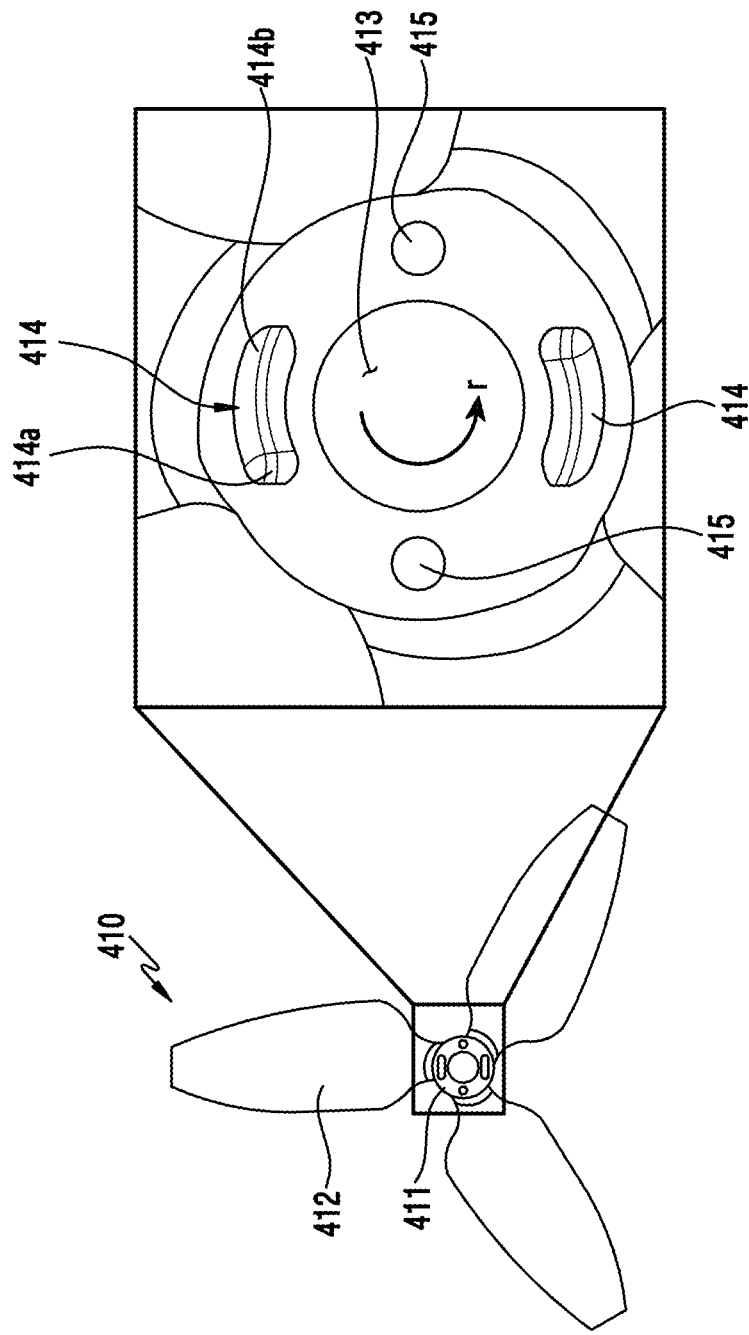
FIG. 4A is a plan view showing a propeller according to various embodiments.
Figure 4B:
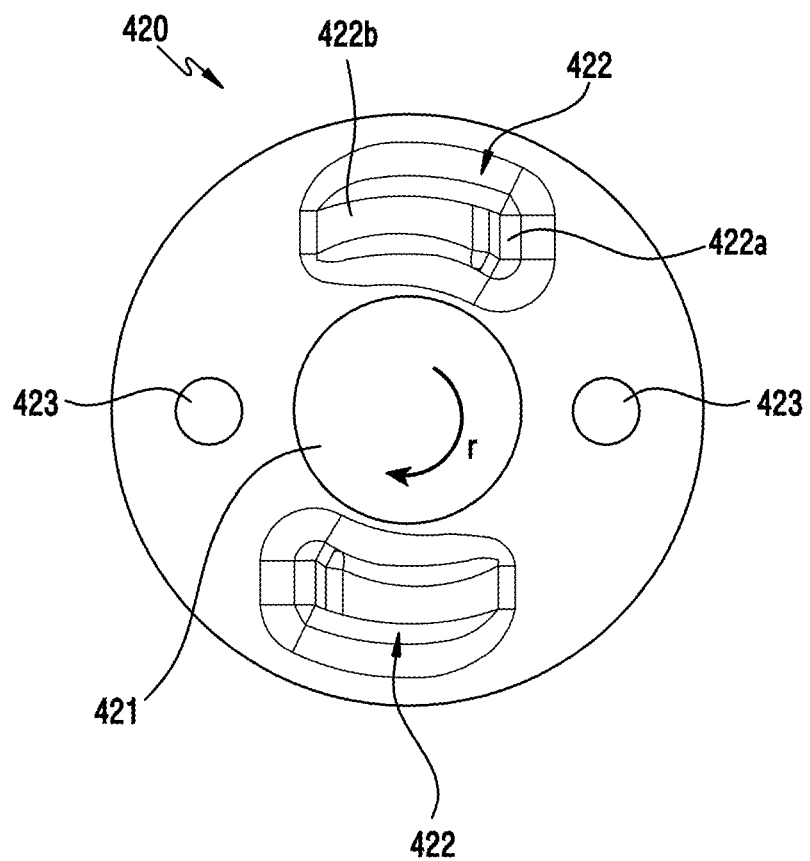
FIG. 4B is a rear view of a cap structure according to various embodiments.
Figure 4C:
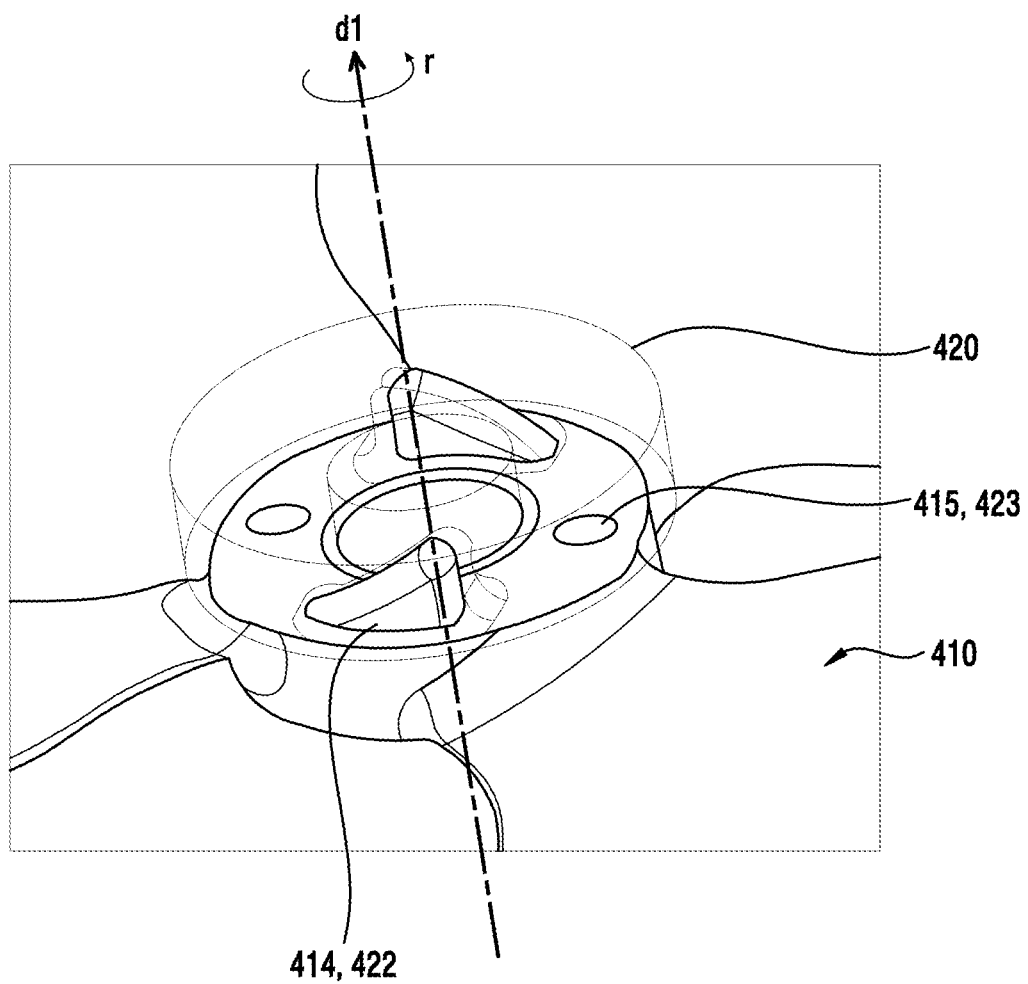
FIG. 4C is an enlarged projective view of the cap structure and the propeller that are combined with each other in accordance with various embodiment.

FIG. 4A is a plan view showing a propeller according to various embodiments. FIG. 4B is a rear view of a cap structure according to various embodiments. FIG. 4C is an enlarged projective view of the cap structure and the propeller that are combined with each other in accordance with various embodiment. A structure (a first mechanism) that restricts axial free movement of a propeller in a propulsion system according to various embodiments is described with reference to FIGS. 4A to 4C.

Referring to FIG. 4A, a propeller 410 according to various embodiments may have a hub 411 and a plurality of blades 412. The blades 412 may be connected to the side of the hub 411 with regular circumferential intervals. The hub 411 may have a through-hole 413 at the center such that the propeller 410 can be freely rotated relative to a rotation shaft (for example, 320 in FIG. 3A) inserted through the through-hole.

According to an embodiment, the hub 411 may have at least one protrusion 414 and/or at least one metallic portion 415 around the through-hole 413. The protrusions 414 and metallic portions 415 may be disposed on the top of the hub 411. For example, the protrusions 414 and metallic portions 415 may be alternately arranged in the rotational direction r on the top of the hub 411. The present disclosure is not limited thereto and, the protrusions 414 and metallic portions 415 may be arranged around the through-hole 413 in accordance with appropriate selective combination and sequence. According to an embodiment, the protrusions 414 may be spirally formed in a first rotational direction r1. The protrusions 414 may have a first inclined portion. For example, the protrusions 414 may have a first inclined portion in which a first end 414a facing the rotational direction r1 is higher than a second end 414b facing an opposite direction to the first direction (or a second rotational direction).

Referring to FIG. 4B, a cap structure 420 according to various embodiments may have a rotation shaft-fixing portion 421, at least one recess 422, and/or at least one magnetic portion 423 on the bottom. The rotation shaft-fixing portion 421 may be fixedly coupled to a second end (for example, 322 in FIG. 3A) of the rotation shaft such that the cap structure 420 and the rotation shaft are not prevented while a motor is operated.

According to an embodiment, the recesses 422 and the magnetic portions 423 may be disposed on the bottom of the cap structure 420. For example, the recesses 422 and magnetic portions 423 may be alternately arranged in the rotational direction r1 on the bottom of the cap structure 420. Alternatively, the recesses 422 and/or the magnetic portions 423 may be arranged to correspond to the protrusions 414 and/or the metallic portions 415 on the hub 411 of the propeller 410 when the propeller 410 and the cap structure 420 are detachably combined. According to an embodiment, the recesses 422 may have a second inclined portion corresponding to the first inclined portion of the protrusions 414. For example, the recesses 422 may have an inclined portion in which a first end 422a facing the rotational direction r1 is deeper than a second end 422b facing the opposite direction to the rotational direction.

Referring to FIG. 4C, the propeller 410 according to various embodiments may be combined with the cap structure 420 with the top thereof facing the bottom of the cap structure 420. Accordingly, the top of the hub 411 may be defined as a surface facing the cap structure. The bottom of the cap structure 420 may be defined as a surface facing the propeller. According to an embodiment, when the propeller 410 and the cap structure 420 are combined, the protrusions 414 of the propeller 410 may be inserted in the recesses 422 of the cap structure 420. Since the protrusions 414 are inserted in the recesses 422, the contact area between the propeller 410 and the cap structure 420 is increased, so the fastening force can be increased. However, the present disclosure is not limited thereto and, according to another embodiment, the cap structure 420 may have protrusions and the hub 411 may have recesses in which the protrusions can be inserted.

According to an embodiment, the axial anti-free movement structure (first mechanism) of the propeller 410 for the cap structure 420 may be implemented by a magnetic force. For example, the propeller 410 and the cap structure 420 may be combined by a magnetic fixing force (or attraction) applied by the magnetic portions 423 to the metallic portions 415 disposed on the hub 411 to correspond to the magnetic portions 423 of the cap structure 420. Accordingly, when the unmanned aerial vehicle (or the propulsion systems) is normally operated, torque from the motors is transmitted to the propellers 410 through the cap structures 420 fixed to the rotation shafts and the propellers 410 can provide a thrust for flying the unmanned aerial vehicle. However, when a force larger than the attraction is applied in the opposite direction to the magnetic fixing force, the propeller 410 and the cap structure 420 may be separated from each other. The magnetic portions 423 and the metallic portions 415 may be integrally formed with the cap structure 420 or the hub 411 (for example, by double injection molding) or may be formed by inserting or attaching (for example, bonding) separate metal plates.

According to another embodiment, the first mechanism may be configured such that the cap structure 420 has metallic portions and the hub 411 has magnetic portions at positions corresponding to the metallic portions or the cap structure 420 and the hub 411 both have magnetic portions.

According to another embodiment, the first mechanism may be configured such that the cap structure 420 has the magnetic portions 423 and the entire top (or the surface facing the cap structure) of the hub 411 of the propeller 410 may be made of metal. Alternatively, the opposite case may be possible.

Figure 5A:
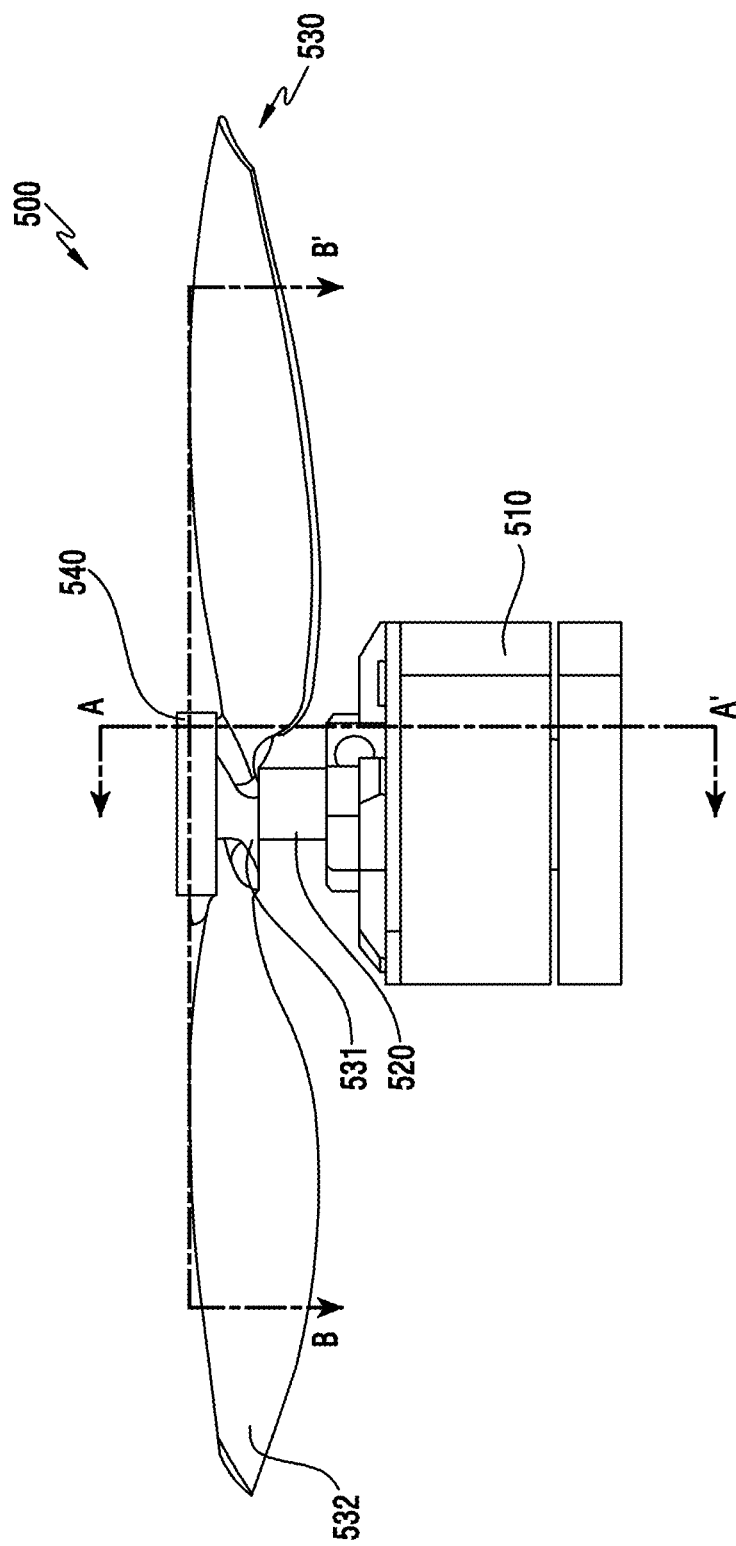
FIG. 5A is a front view of a propulsion system according to various embodiments.
Figure 5B:
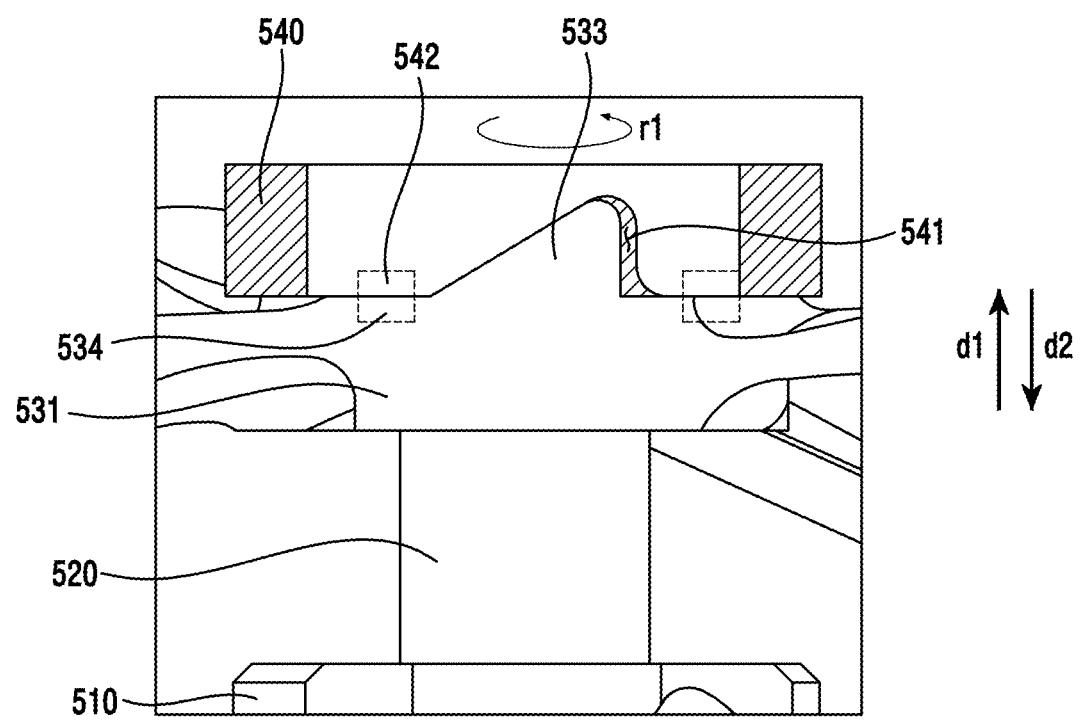
FIG. 5B is a partial cross-sectional view taken along line A-A' of the propulsion system shown in FIG. 5A.
Figure 5C:
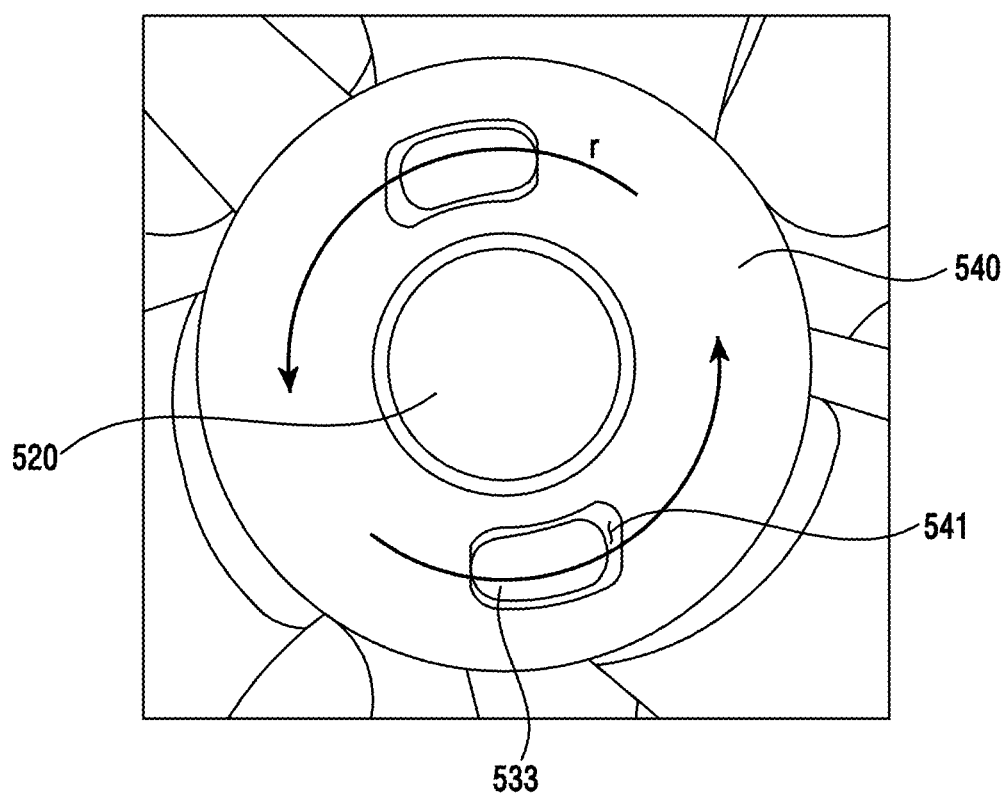
FIG. 5C is a partial cross-sectional view taken along line B-B' of the propulsion system shown in FIG. 5A.

FIG. 5A is a front view of a propulsion system according to various embodiments. FIG. 5B is a partial cross-sectional view taken along line A-A' of the propulsion system shown in FIG. 5A. FIG. 5C is a partial cross-sectional view taken along line B-B' of the propulsion system shown in FIG. 5A. A structure (a first mechanism) that restricts free rotation of a propeller in a propulsion system according to various embodiments is described with reference to FIGS. 5A to 5C.

Referring to FIG. 5A, a propulsion system 500 according to various embodiments may include a motor 510, a rotation shaft 520, a propeller 530, and a cap structure 540. The rotation shaft 520 may be configured such that an end is connected to the motor 510 to receive torque from the motor 510 and the other end fixedly coupled to the cap structure 540. The propeller 530 is assembled such that a hub 531 to which blades 532 are connected can be freely rotated or axially moved on the rotation shaft 520, and may be combined to be separable from the cap structure 540 in a normal operation state.

Referring to FIG. 5B, the propeller 530 according to various embodiments may be combined with the cap structure 540. For example, the cap structure 540 and the propeller 530 may have a fixedly coupling force in an axial direction d1 by a first mechanism composed of at least one magnetic portion 542 of the cap structure 540 and at least one metallic portion 534 of the hub 531 of the propeller 530. In other words, the propeller 530 can stay combined with the cap structure 540 by a magnetic fixing force between the magnetic portions 542 and the metallic portions 534 even though a separation force is applied in a second direction d2 by the weight. Protrusions 533 of the hub 531 may be inserted in recesses 541 of the cap structure 540. Accordingly, the top of the propeller 530 and the bottom of the cap structure 540 are substantially in contact with each other, so the magnetic portions 542 and the metallic portions 534 can be in direct contact with each other.

Referring to FIG. 5C, an anti-free rotation structure (second mechanism) that the propeller 530 and the cap structure 540 according to various embodiments have in order to fix the propeller 530 by restricting rotation of the propeller 530 may be composed of the protrusions 533 of the hub 531 and the recesses 541 of the cap structure 540. For example, torque from the motor 510 can be transmitted to the cap structure 540. The protrusions 533 of the propeller 530 can be inserted in the recesses 541 of the cap structure 540. The inserted protrusions 533 can restrict free rotation of the propeller 530 on the cap structure 540. Alternatively, the torque can be transmitted such that the propeller 530 is also rotated with rotation of the cap structure 540.

Figure 6A:
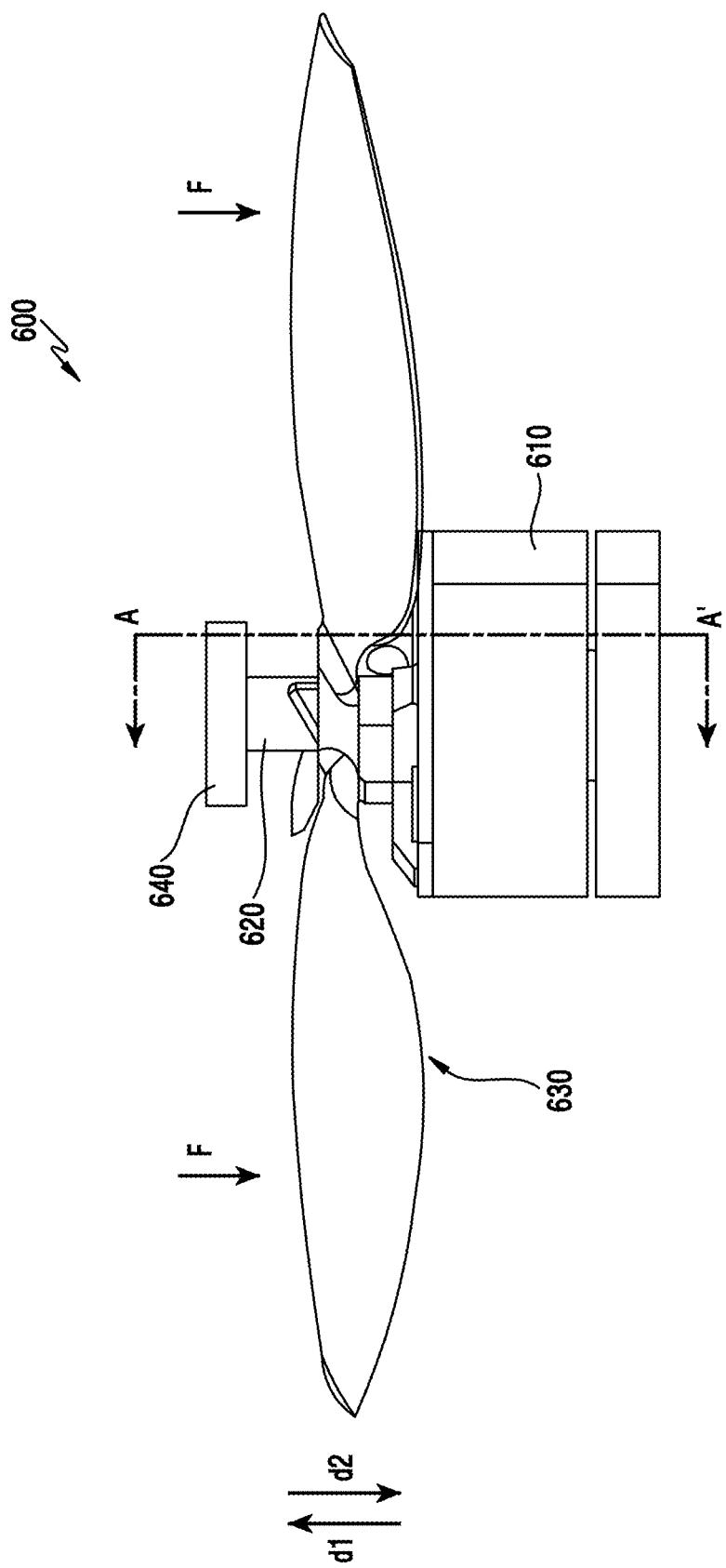
FIG. 6A is a front view showing a state in which a propeller and a cap structure are separated by an external force axially applied to a propulsion system according to various embodiments.
Figure 6B:
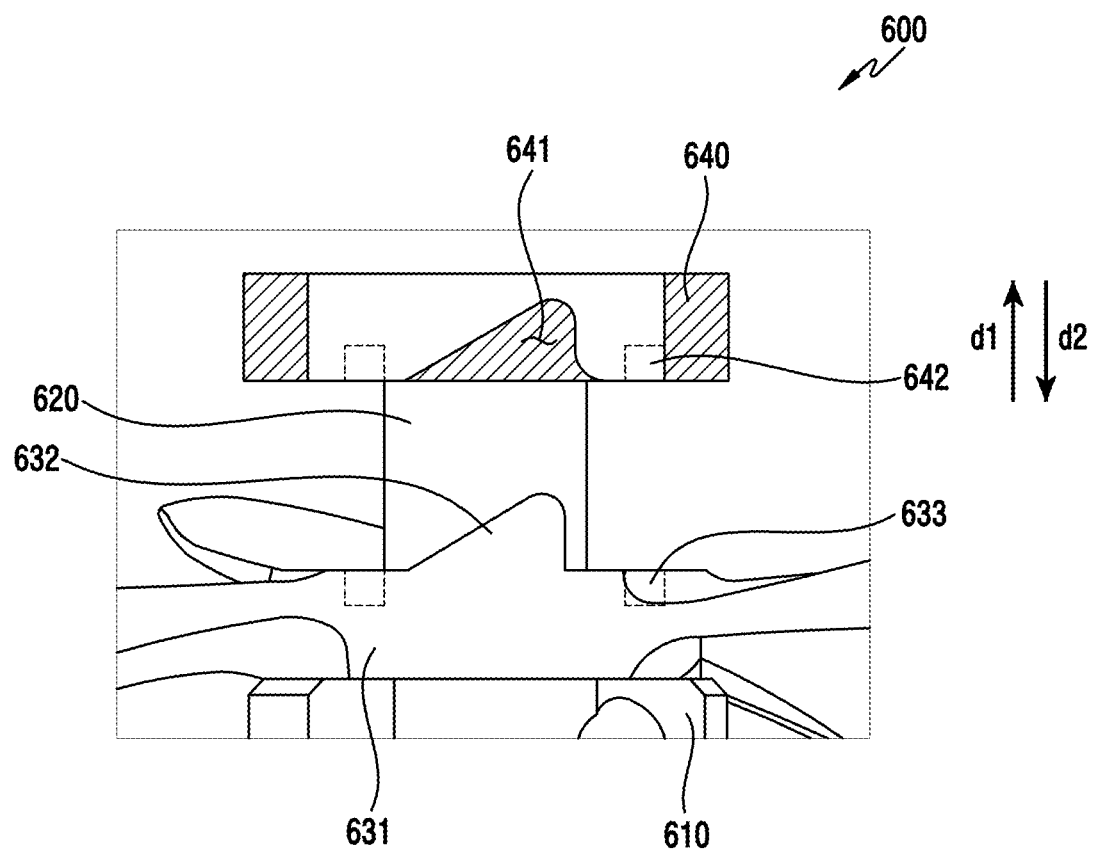
FIG. 6B is a partial cross-sectional view taken along line A-A' of the propulsion system shown in FIG. 6A.

FIG. 6A is a front view showing a state in which a propeller and a cap structure are separated by an external force axially applied to a propulsion system according to various embodiments. FIG. 6B is a partial cross-sectional view taken along line A-A' of the propulsion system shown in FIG. 6A. A process in which a propeller and a cap structure that are detachably combined are separated (or the axial anti-free movement structure is unlocked) by an external force in a propulsion system according to various embodiments is described with reference to FIGS. 6A and 6B.

Referring to FIG. 6A, according to various embodiments, in a normal operation state, in a propulsion system 600, a propeller 630 can be separated from the cap structure 640 by an axial external force F. For example, an external force F may be applied to the propeller 630 in a downward direction d2 (or the weight direction of the propeller 630) due to interference by a person or an obstacle positioned in the upward direction d1 (or in the thrust direction). The propeller 630 and the cap structure 640 may be separated by an external force applied in the downward direction d2. The propeller 630 separated from the cap structure 640 cannot receive torque from the motor 610, so it may not be rotated unlike the rotation shaft 620 and the cap structure 640 that are rotated. In other words, after the propeller 630 detachably combined with the cap structure 640 is separated, the propeller 630 stops rotation even though the rotation shaft 620 keeps rotating by the motor 610 that is in operation, whereby it is possible to prevent a person or an obstacle from being injured or damaged.

Referring to FIG. 6B, the propeller 630 of the propulsion system 600 according to various embodiments may be separated from the cap structure 640 by an external force F applied in the weight direction d2, in the propulsion system 600 according to various embodiments. For example, when the external force F applied in the weight direction d2 is larger than a magnetic fixing force (attraction) generated by magnetic portions 642 and metallic portions 633 on the hub 631 of the propeller 630, the propeller 630 can be unlocked from the cap structure 640. The state in which the propeller 630 and the cap structure 640 are separated from each other may be defined as a free state. In the free state, the propeller 630 can be moved on the rotation shaft 620 in the weight direction d2 toward the motor 610. Alternatively, in the free state, the protrusions 632 of the propeller 630 can be separated out of the recesses 641 of the cap structure 640. Accordingly, in the propulsion system 600 according to various embodiments, the propeller 630 and the cap structure 640 can be separated by an external force. Alternatively, the axial anti-free movement structure of the propeller 630 can be unlocked.

Figure 7:
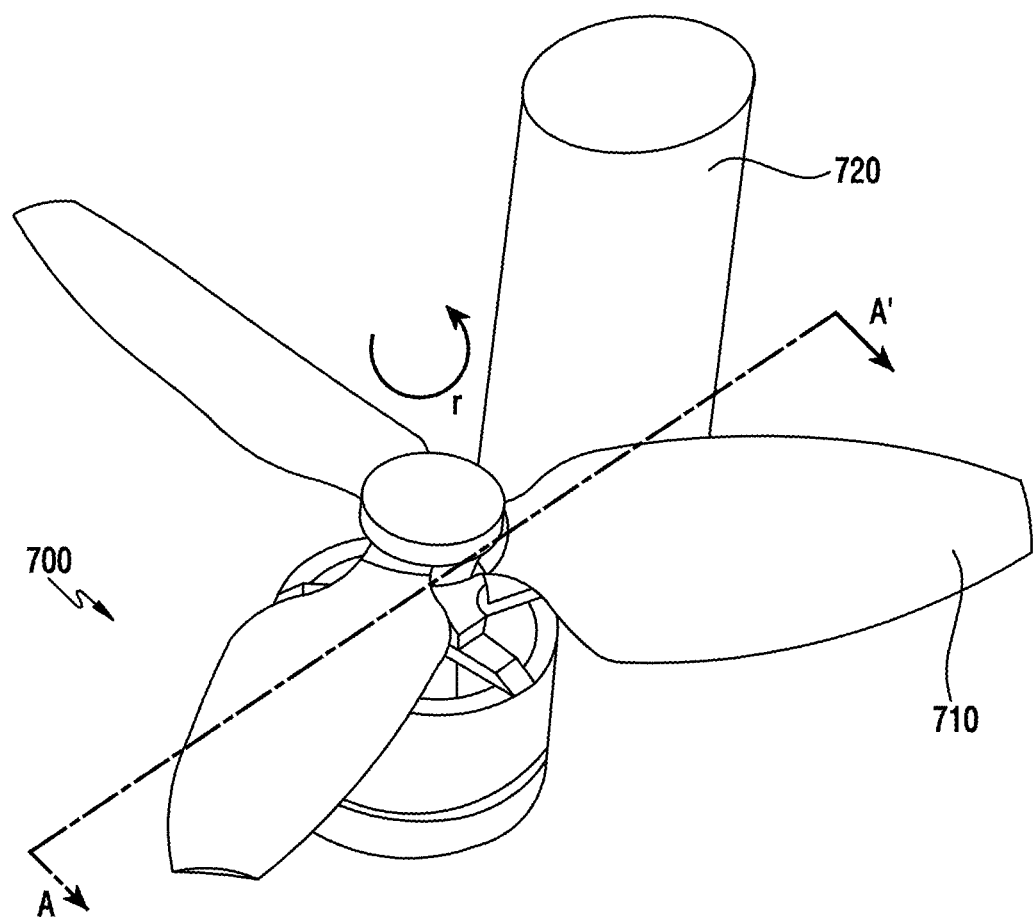
FIG. 7 is a perspective view showing a state in which an external force is applied due to interference by an obstacle in a rotation area of a propeller that is rotated in a propulsion system according to various embodiments.

FIG. 7 is a perspective view showing a state in which an external force is applied due to interference by an obstacle in a rotation area of a propeller that is rotated in a propulsion system according to various embodiments.

Referring to FIG. 7, when the propulsion system 700 according to various embodiments is normally rotated and there is interference by a person or an obstacle 720 in a rotation area of a propeller 710, an external force may be applied to the propeller 710 in the opposite direction to a rotational direction. If the propulsion system 600 keeps normally operating, the propeller 710 that is being rotated at a high speed may injure the person or damage the obstacle 720 or the propeller 710 may be damaged. However, since a torque is not transmitted to the propeller 710 according to various embodiments when an external force is applied, injury of a person or damage to an obstacle 720 can be prevented.

FIGS. 8A, 8B, 8C and 8D are partial cross-sectional views taken along line A-A' of the propulsion system shown in FIG. 7. A process in which a propeller and a cap structure are separated (or the axial anti-free movement structure is unlocked) by an external force in a propulsion system according to various embodiments is described with reference to FIGS. 8A, 8B, 8C and 8D.

Figure 8A:
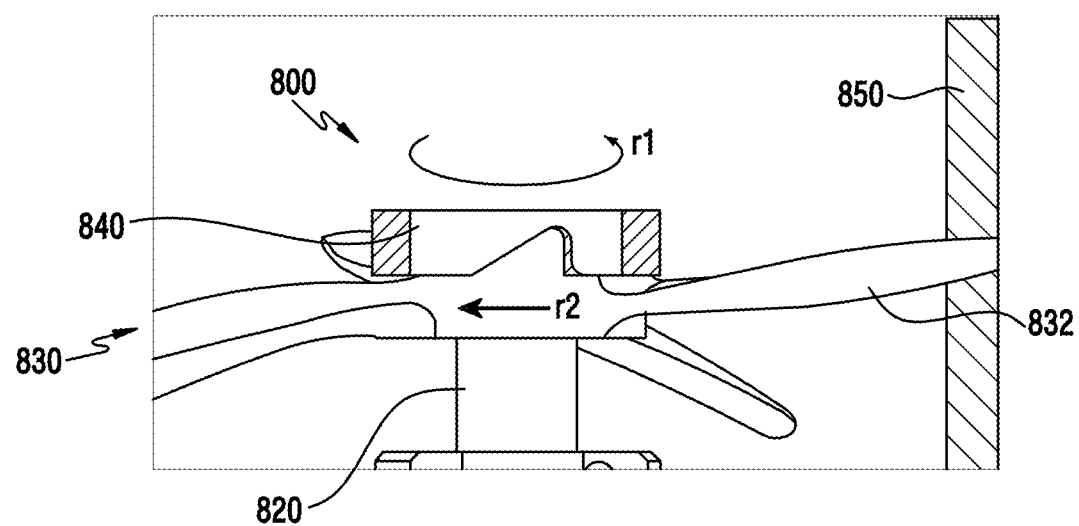
FIGS. 8A, 8B, 8C and 8D are partial cross-sectional views taken along line A-A' of the propulsion system shown in FIG. 7A.
Figure 8B:
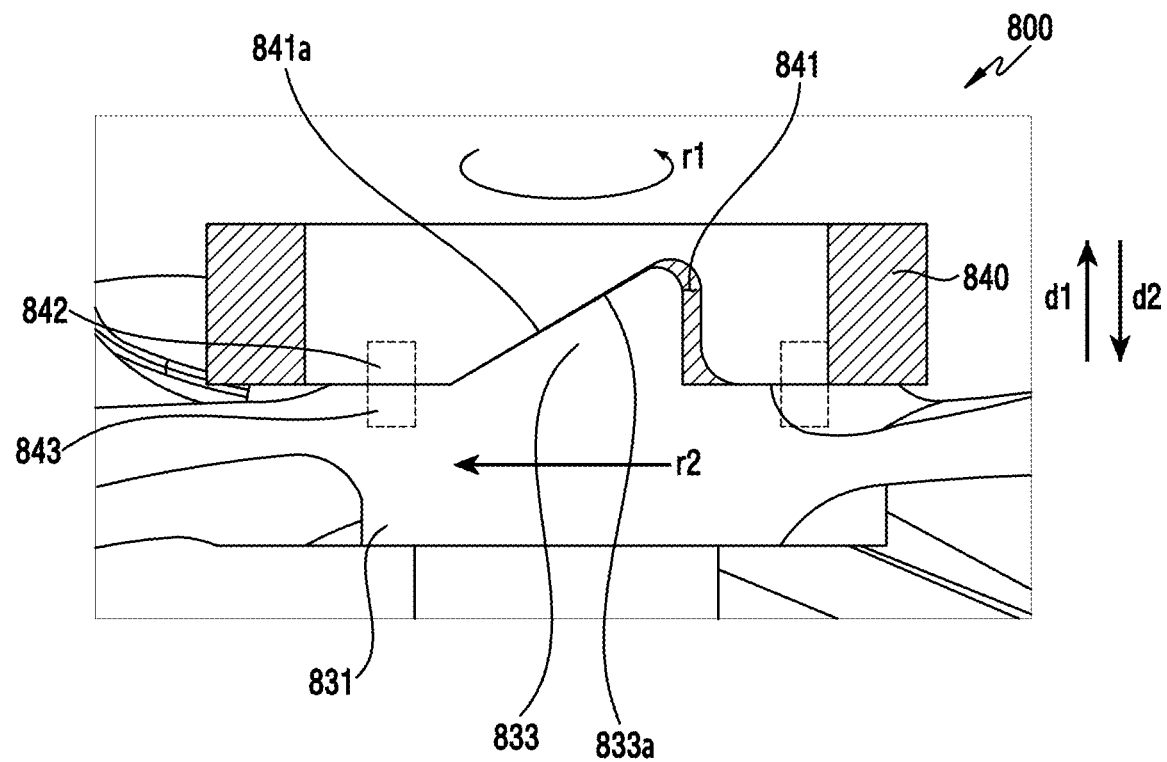

Referring to FIGS. 8A and 8B, while the propeller 830 according to various embodiments is detachably combined with the cap structure 840 by a first mechanism composed of at least one magnetic portion 842 of the cap structure 840 and at least one metallic portion 843 of the hub 831 and is rotated at a high speed in the rotational direction r1, an obstacle 850 may cause interference in the rotation area of blades 832. Rotation of the blades 832 may be stopped by the interfering obstacle 850. Further, since the propulsion system 800 is in normal operation, the cap structure 840 may have torque in the rotational direction r1. Accordingly, the propeller 830 may be rotated in the opposite direction r2 to the rotational direction r1 relative to the cap structure 840. In this process, first inclined portions 833a of protrusions 833 of a hub 831 may slide in the opposite direction r2 on second inclined portions 841a of recesses 841 of the cap structure 840.

Figure 8C:
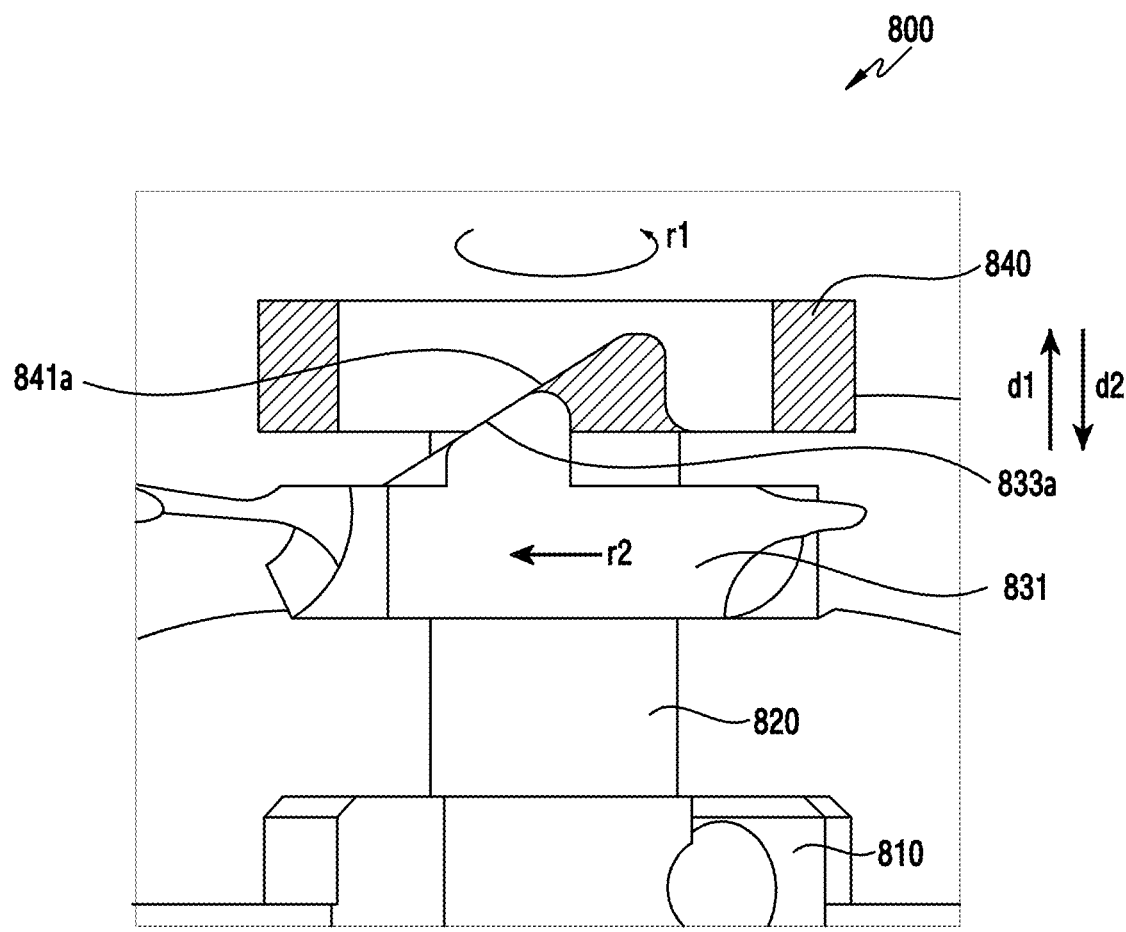

Referring to FIG. 8C, the propeller 830 according to various embodiments can be separated from the cap structure 840 by sliding of the first inclined portions 833a and the second inclined portions 841a. In detail, when the hub 831 slides relative to the cap structure 840 in the opposite direction r2, the first inclined portions 833a of the protrusions 833 can slide in the opposite direction r2 relative to the second inclined portions 841a of the cap structure 840. In this case, the propeller 830 can be moved in the downward direction (or the weight direction) relative to the rotation shaft 820 by the shapes of the first inclined portions 833a and the second inclined portions 841a.

Figure 8D:
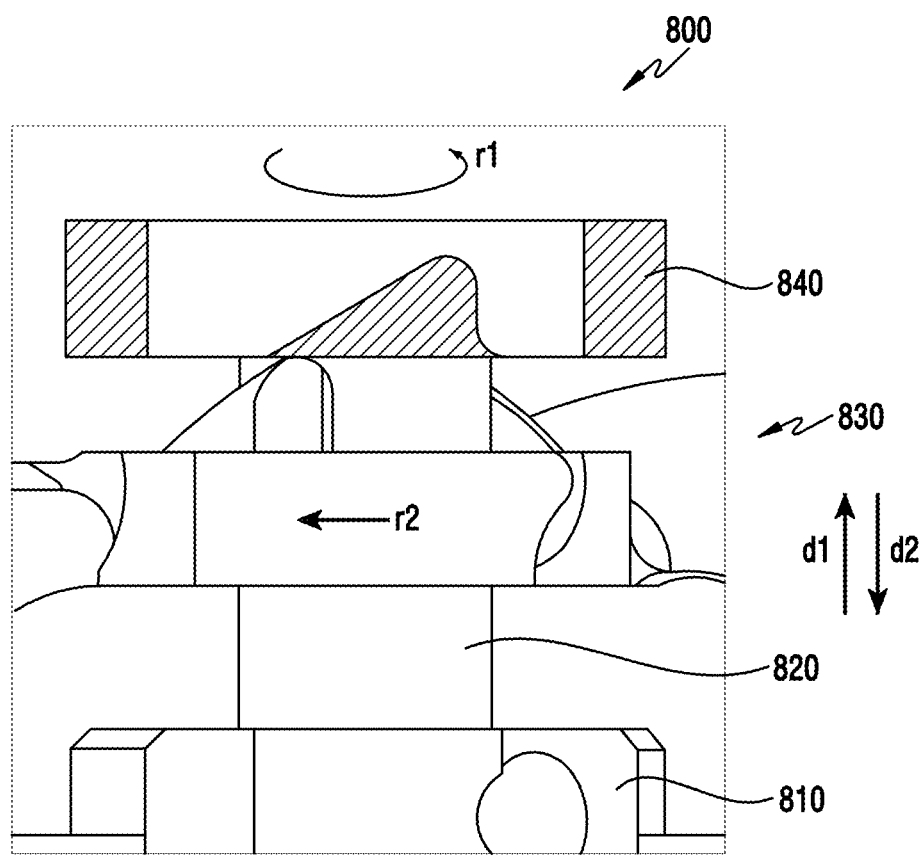

Referring to FIG. 8D, the propeller 830 according to various embodiments can be completely separated from the cap structure 840. The protrusions 833 of the hub 831 can be fully separated out of the recesses 841 of the cap structure 840. The propeller 830 can idle relative to the rotation shaft 820 even though the rotation shaft 820 and the cap structure 840 are rotated by torque from a motor 810. Accordingly, in the propulsion system 800 according to various embodiments, the propeller 830 and the cap structure 840 can be separated when interference by an obstacle occurs. Alternatively, the anti-free rotation structure of the propeller 830 can be unlocked.

Figure 9A:
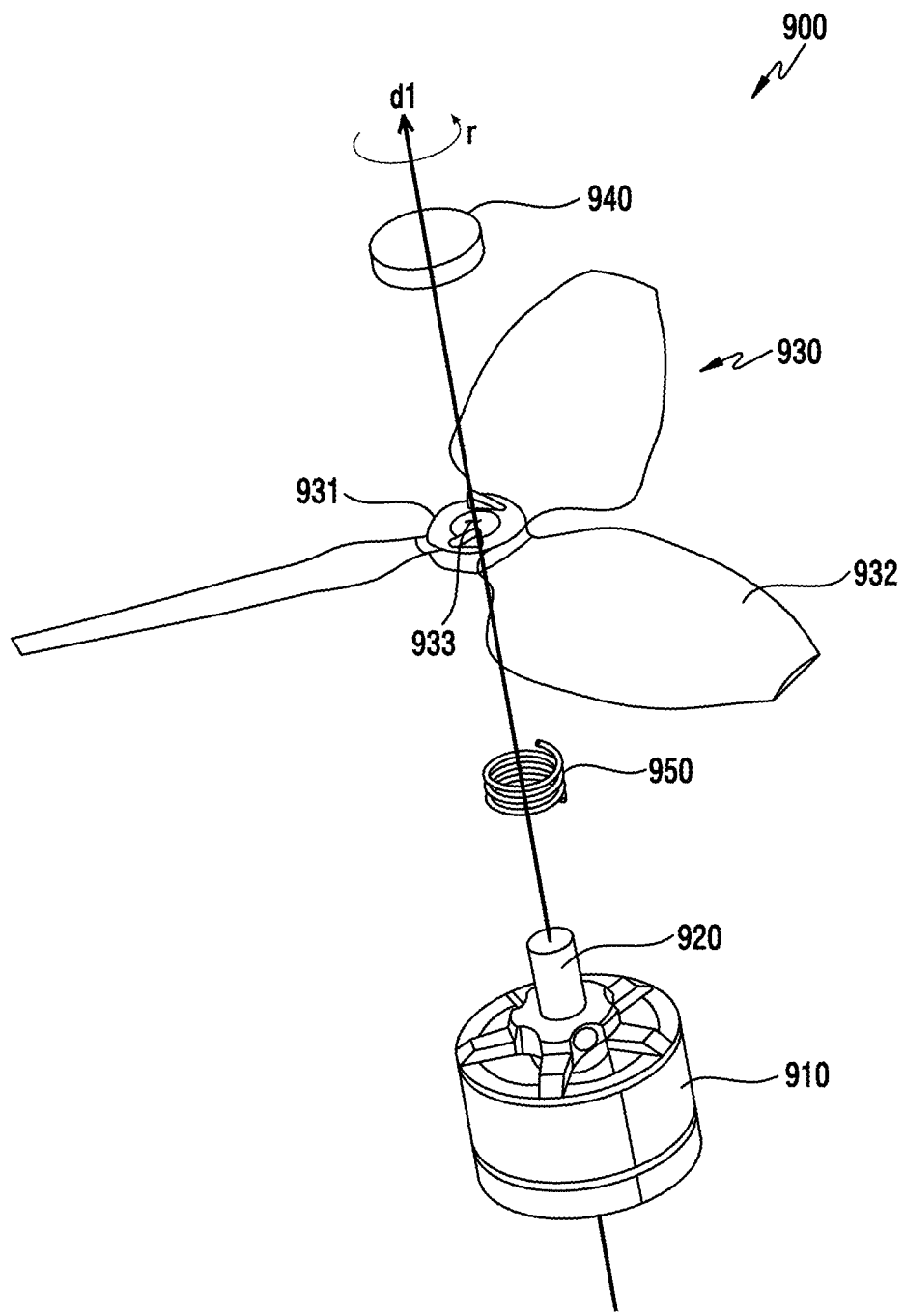
FIG. 9A is an exploded view of a propulsion system according to various embodiments.
Figure 9B:
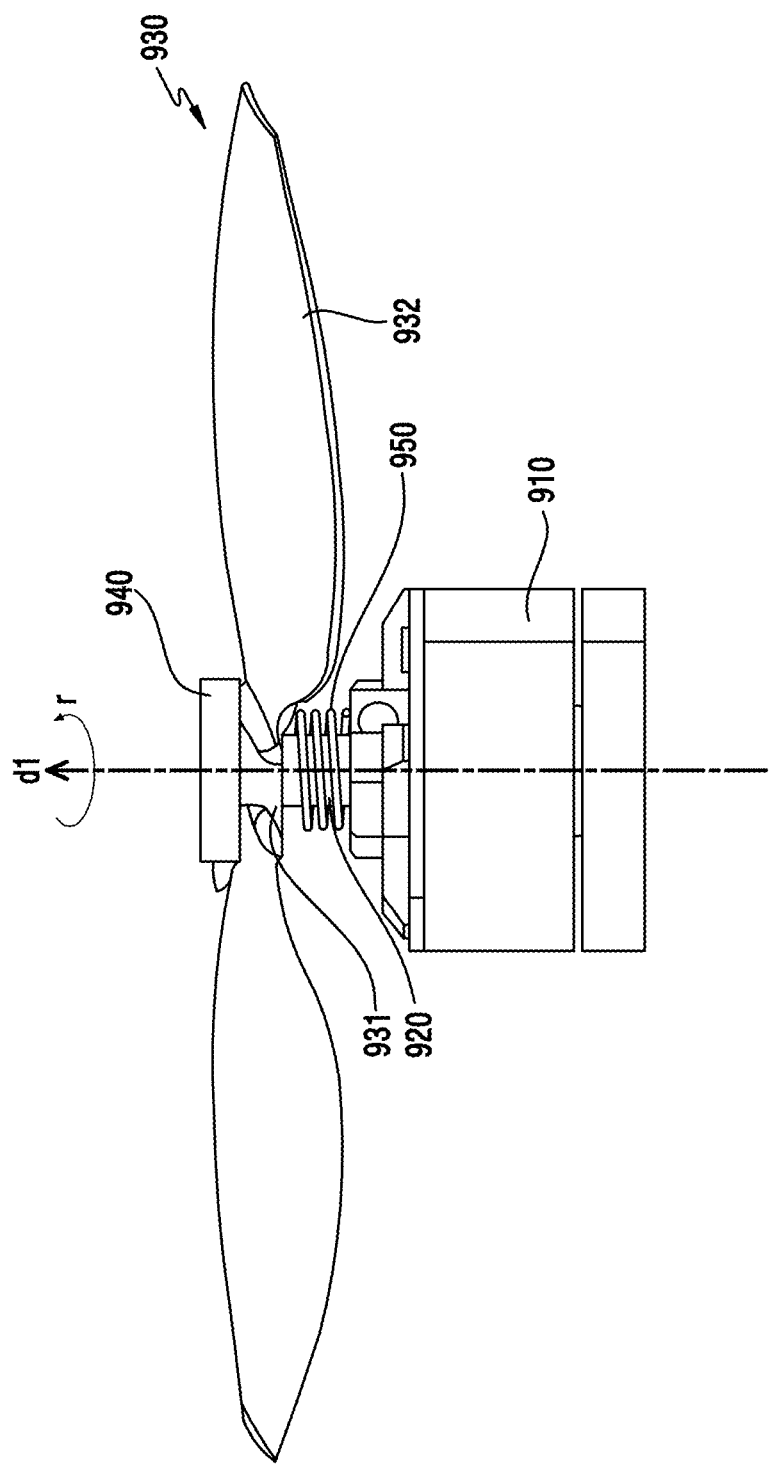
FIG. 9B is a front view of the propulsion system completely assembled, according to various embodiments.

FIG. 9A is an exploded view of a propulsion system according to various embodiments. FIG. 9B is a front view of the propulsion system completely assembled, according to various embodiments. A propulsion system according to various embodiments is described with reference to FIGS. 9A and 9B. A propulsions system 900 shown in FIGS. 9A and 9B may constitute the propulsion systems 210 shown in FIG. 2.

Referring to FIG. 9A, a propulsion system 900 according to various embodiments may include a motor 910, a rotation shaft 920, a propeller 930, a cap structure 940, and a spring 950.

According to an embodiment, the rotation shaft 920 may be configured to be rotated in a rotational direction r by the motor 910. For example, the rotation shaft 920 may have a rod shape extending in a first direction d1 (or axial direction). An end of the rotation shaft 920 may be connected to the motor 910 such that torque from the motor 910 is directly applied to the rotation shaft 920 or is indirectly applied, for example, through a gear box etc.

The propeller 930 according to an embodiment may have a plurality of blades 932 and a through-hole 933 formed at the center of the hub 931. The blades 932 may be connected to the side of the hub 931 with regular circumferential intervals. In the propeller 930, the hub 931 and the blades 932 may be integrally formed, or the hub 931 and the blades 932 may be combined. The through-hole 933 may be formed at the center of the hub 931 such that the rotation shaft 920 can be rotated therein. The propeller 930 may be assembled such that the rotation shaft 920 is inserted through the through-hole 933. The through-hole 933 may be configured to be larger in radius than the rotation shaft 920 such that the propeller 930 can be freely rotated without being restricted by rotation of the rotation shaft 920.

The cap structure 940 according to an embodiment may be fixedly coupled to the other end of the rotation shaft 920. The cap structure 940 may be configured to hold the propeller 930 to prevent the propeller 930 from being separated from the rotation shaft 920. Accordingly, the cap structure 940 may be referred to as a holder. The fixed coupling of the cap structure 940 and the rotation shaft 920 may be made by thread-fastening, snap-fitting, bonding, etc. that prevent them from being separated while the propulsion system 900 is operated.

The spring 950 according to an embodiment may be fitted on the rotation shaft 920 between the motor 910 and the propeller 930. Referring to FIG. 9B, an axial anti-free movement structure (first mechanism) of the propeller 930 for of the cap structure 940 may be implemented by an elastic force. For example, the propeller 930 and the cap structure 940 can be detachably fixed or connected by an elastic force applied in a first direction d1 by the spring 950. The spring 950 can provide an elastic force that pushes the bottom of the hub 931 of the propeller 930 in the first direction d1. The propeller 930 can be brought in close contact with the cap structure 940 fixed to the other end of the rotation shaft 920 by the elastic force provided by the spring 950. The spring 950 may have a function of restricting free movement of the propeller 930 in the first direction d1. The cap structure 940 connected to the propeller 930 can apply the torque transmitted from the motor 910 through the rotation shaft 920 to the propeller 930. The cap structure 940 and the propeller 930 can be separated against the elastic force of the spring 950 in a predetermined situation.

Figure 10A:
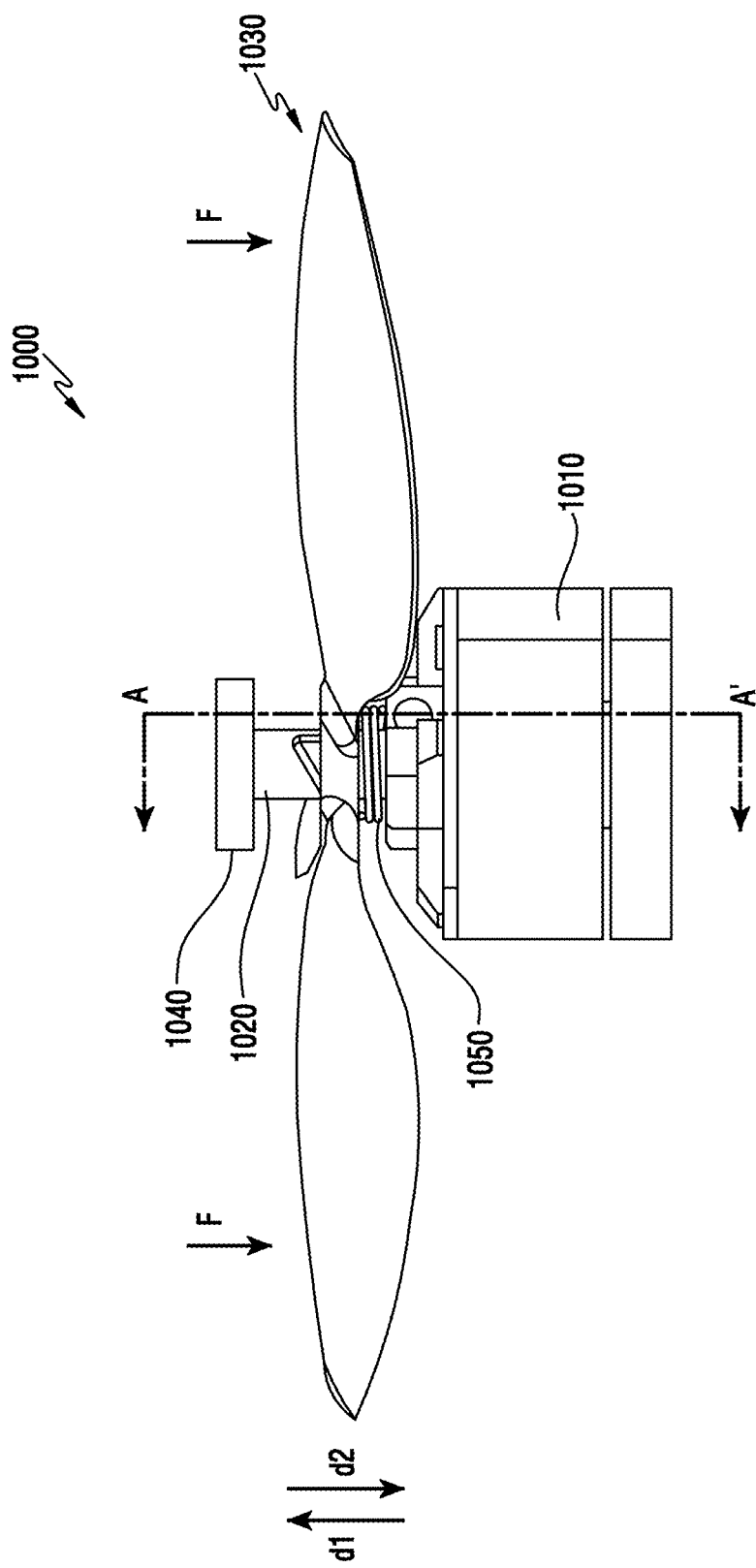
FIG. 10A is a front view showing a state in which a propeller and a cap structure are separated by an external force axially applied to the propulsion system according to various embodiments.
Figure 10B:
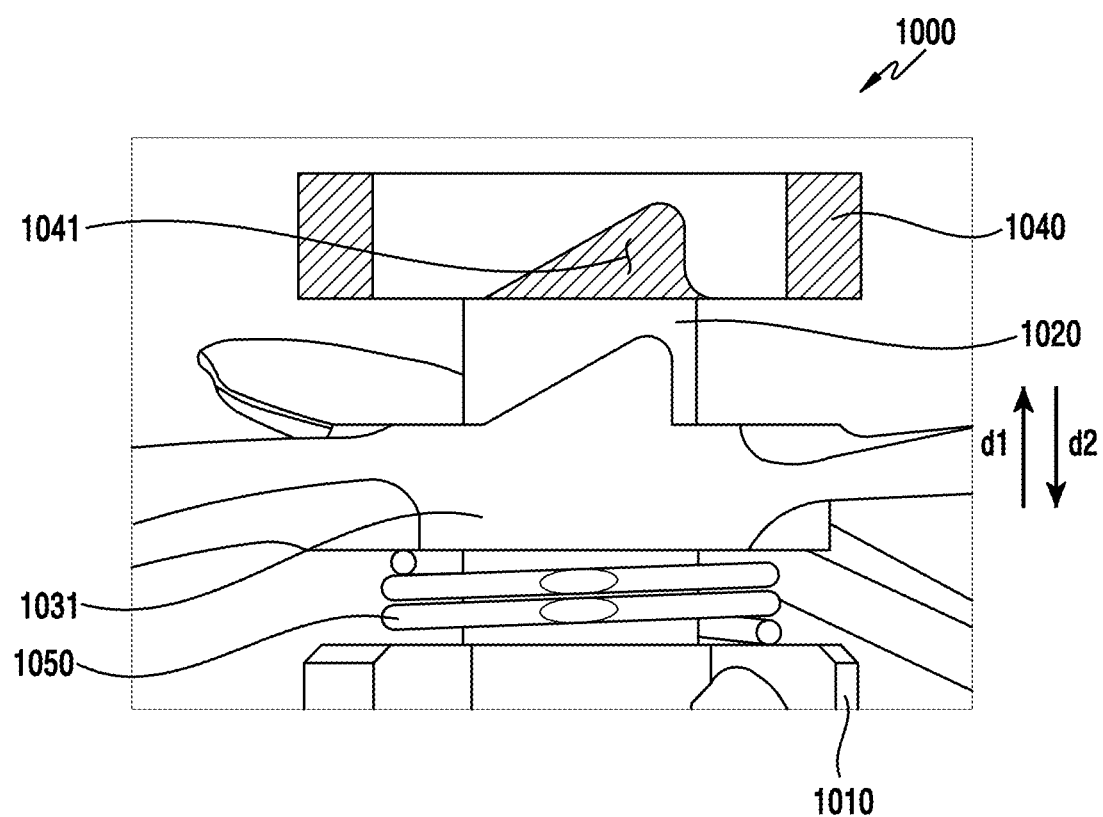
FIG. 10B is a partial cross-sectional view taken along line A-A' of the propulsion system shown in FIG. 10A.

FIG. 10A is a front view showing a state in which a propeller and a cap structure are separated by an external force axially applied to a propulsion system according to various embodiments. FIG. 10B is a partial cross-sectional view taken along line A-A' of the propulsion system shown in FIG. 10A.

Referring to FIGS. 10A and 10B, a propeller 1030 of a propulsion system 1000 according to an embodiment can be separated from a cap structure 1040 by an external force F that is applied downward due to interference by a person or an obstacle positioned over the propeller 1030. For example, in an unmanned aerial vehicle including the propulsion system 1000, an external force F may be applied to the propeller 1030 in a downward direction d2 (or the weight direction of the propeller 1030) due to interference by a person or an obstacle positioned in the upward direction d1 (or in the thrust direction). The propeller 1030 and the cap structure 1040 may be separated by an external force F applied in the downward direction d2. For example, when a force pushing a hub 1031 downward by an external force F applied to the propeller 1030 is larger than an elastic force applied by a spring 1050 to push the propeller 1030 toward the cap structure 1040, the propeller 1030 and the cap structure 1040 can be separated. The propeller 1030 separated from the cap structure 1040 cannot receive torque from the motor 1010, so it may not be rotated unlike a rotation shaft 1020 and the cap structure 1040 that are rotated. In other words, after the propeller 1030 separated from the cap structure 1040 stops rotation even though the rotation shaft 1020 keeps rotating by the motor 1010 that is in operation, whereby it is possible to prevent a person or an obstacle from being injured or damaged. Accordingly, it is possible to provide a safe propulsion system that can prevent a person or an obstacle, which causes an external force over the propeller 1030, from being injured or damaged.

Figure 11A:
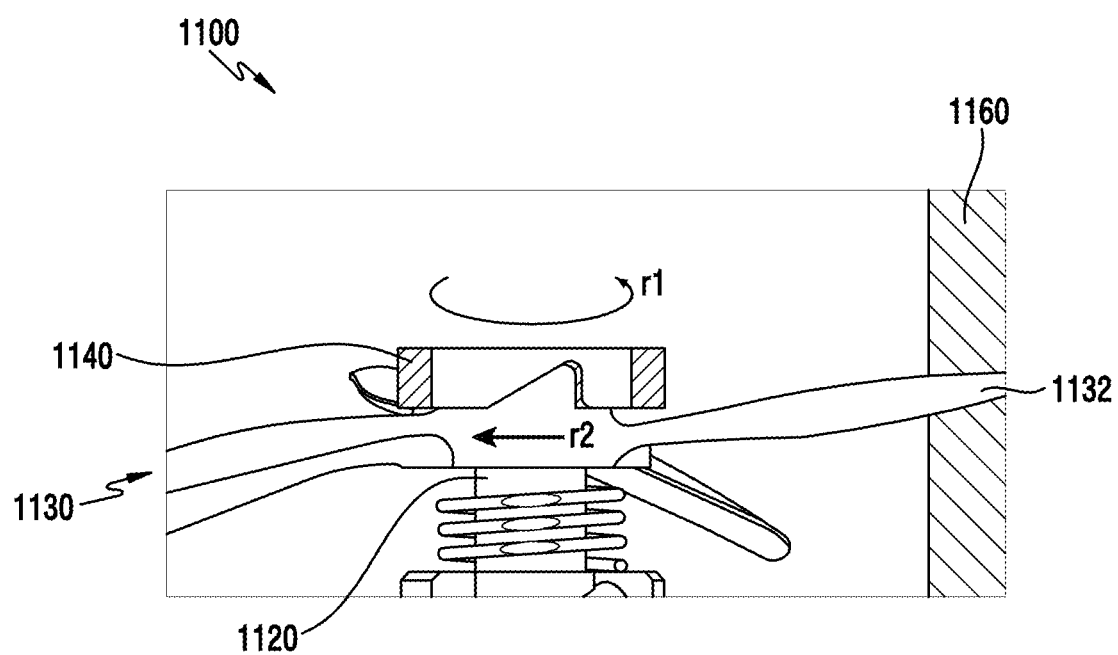
FIGS. 11A and 11B are partial cross-sectional views taken along line A-A' of the propulsion system shown in FIG. 7.
Figure 11B:
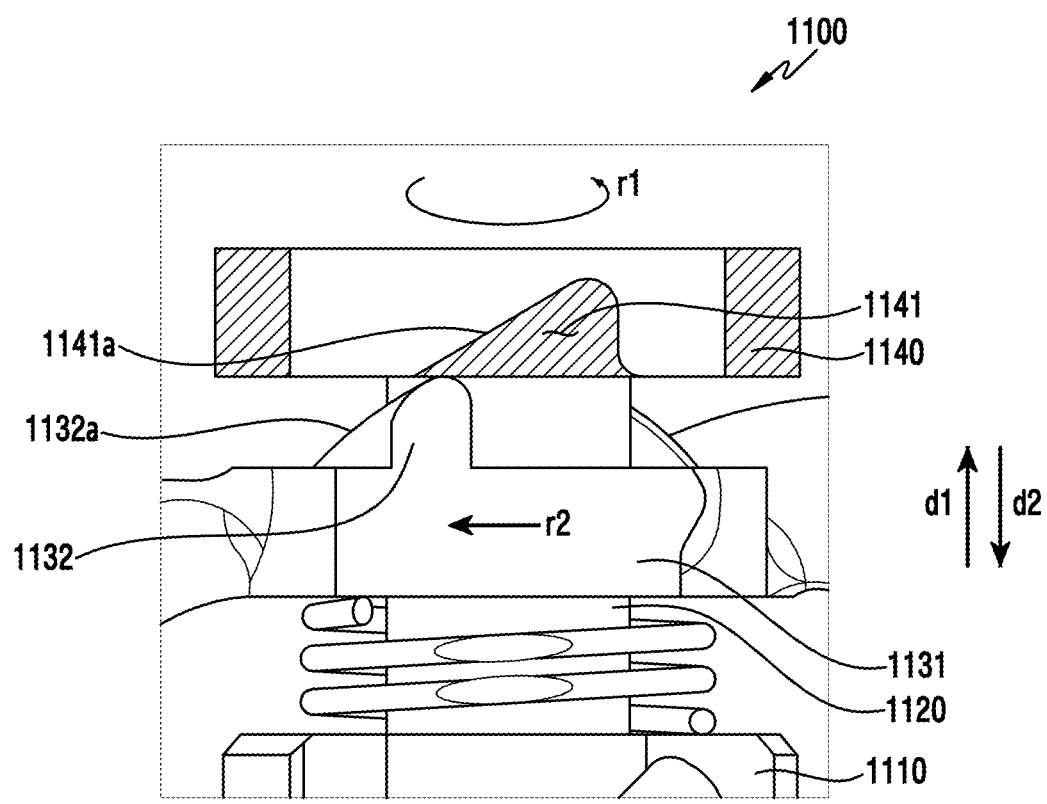

FIGS. 11A and 11B are partial cross-sectional views taken along line A-A' of the propulsion system shown in FIG. 7. A process in which a propeller and a cap structure are separated by an external force caused by an obstacle in the rotation area of the propeller in a propulsion system according to an embodiment is described with reference to FIGS. 11A and 11B.

Referring to FIGS. 11A and 11B, while a propeller 1130 according to various embodiments is detachably combined with a cap structure 1140 and is rotated at a high speed in a rotational direction r1, an obstacle 1160 may cause interference in the rotation area of blades 1132. Rotation of the blades 1132 may be stopped by the interfering obstacle 1160. Further, since the propulsion system 1100 is in normal operation, the cap structure 1140 may have torque in the rotational direction r1. Accordingly, the propeller 1130 may be rotated in the opposite direction r2 to the rotational direction r1 relative to the cap structure 1140. First inclined portions 1132a of protrusions 1132 of a hub 1131 may slide in the opposite direction r2 on second inclined portions 1141a of recesses 1141 of the cap structure 1140.

According to various embodiments, the propeller 1130 can be separated from the cap structure 1140 by sliding of the first inclined portions 1132a and the second inclined portions 1141a. In detail, when the hub 1131 slides relative to the cap structure 1140 in the opposite direction r2, the first inclined portions 1132a of the protrusions 1132 can slide in the opposite direction r2 relative to the second inclined portions 1141a of the cap structure 1140. In this case, the propeller 1130 can be moved in the downward direction d2 (or the weight direction) relative to the rotation shaft 1120 by the shapes of the first inclined portions 1132a and the second inclined portions 1141a. When the protrusions 1132 completely slide out of the recesses 1141, the propeller 1130 and the cap structure 1140 can be completely separated. Accordingly, the propeller 1130 can idle relative to the rotation shaft 1120 even though the rotation shaft 1120 and the cap structure 1140 are rotated by torque from a motor 1110. Accordingly, in the propulsion system 1100 according to various embodiments, the propeller 1130 and the cap structure 1140 can be separated when interference by an obstacle occurs. Accordingly, it is possible to provide a safe propulsion system that can prevent a person or an obstacle, which causes interference in the rotation area of the propeller 1130, from being injured or damaged.

Figure 12A:
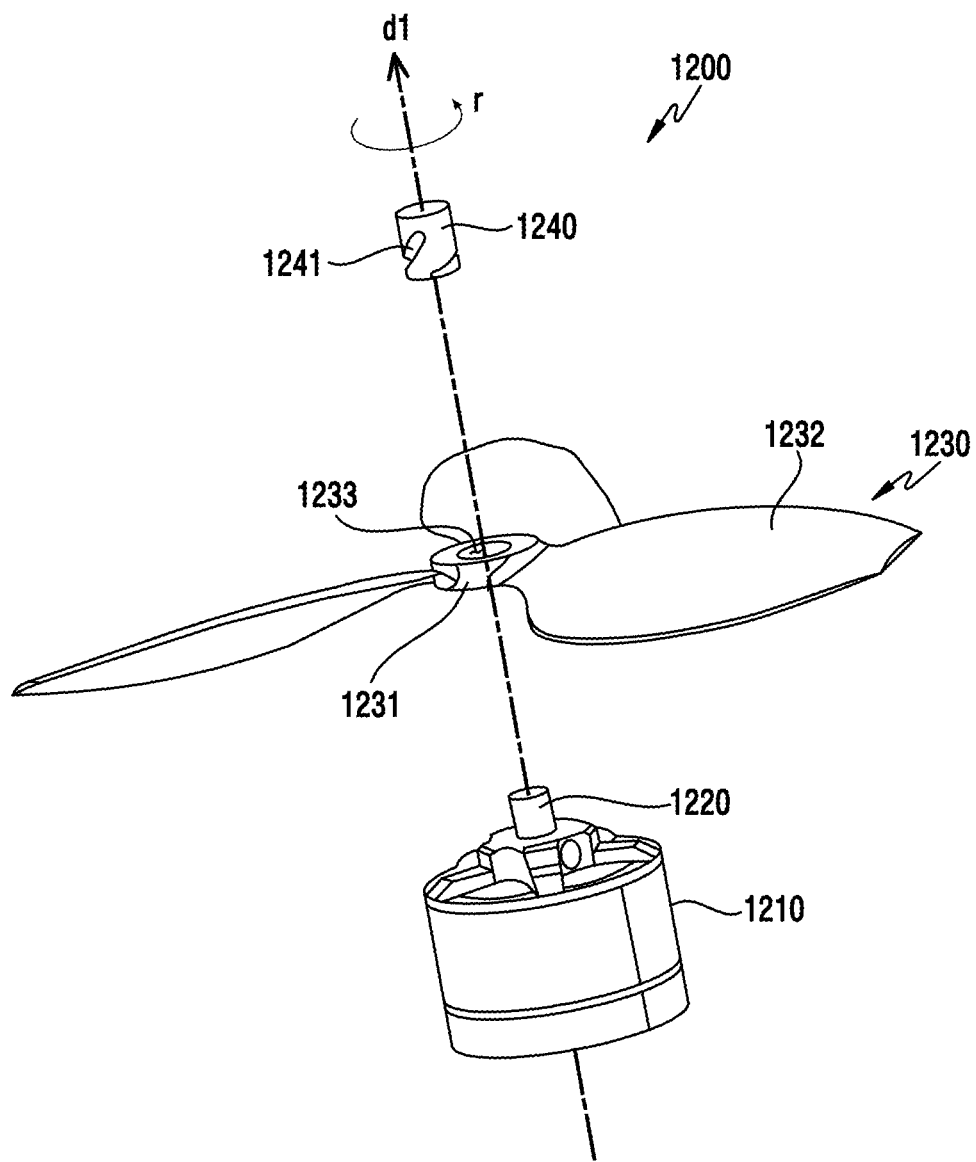
FIG. 12A is an exploded view of a propulsion system according to various embodiments.
Figure 12B:
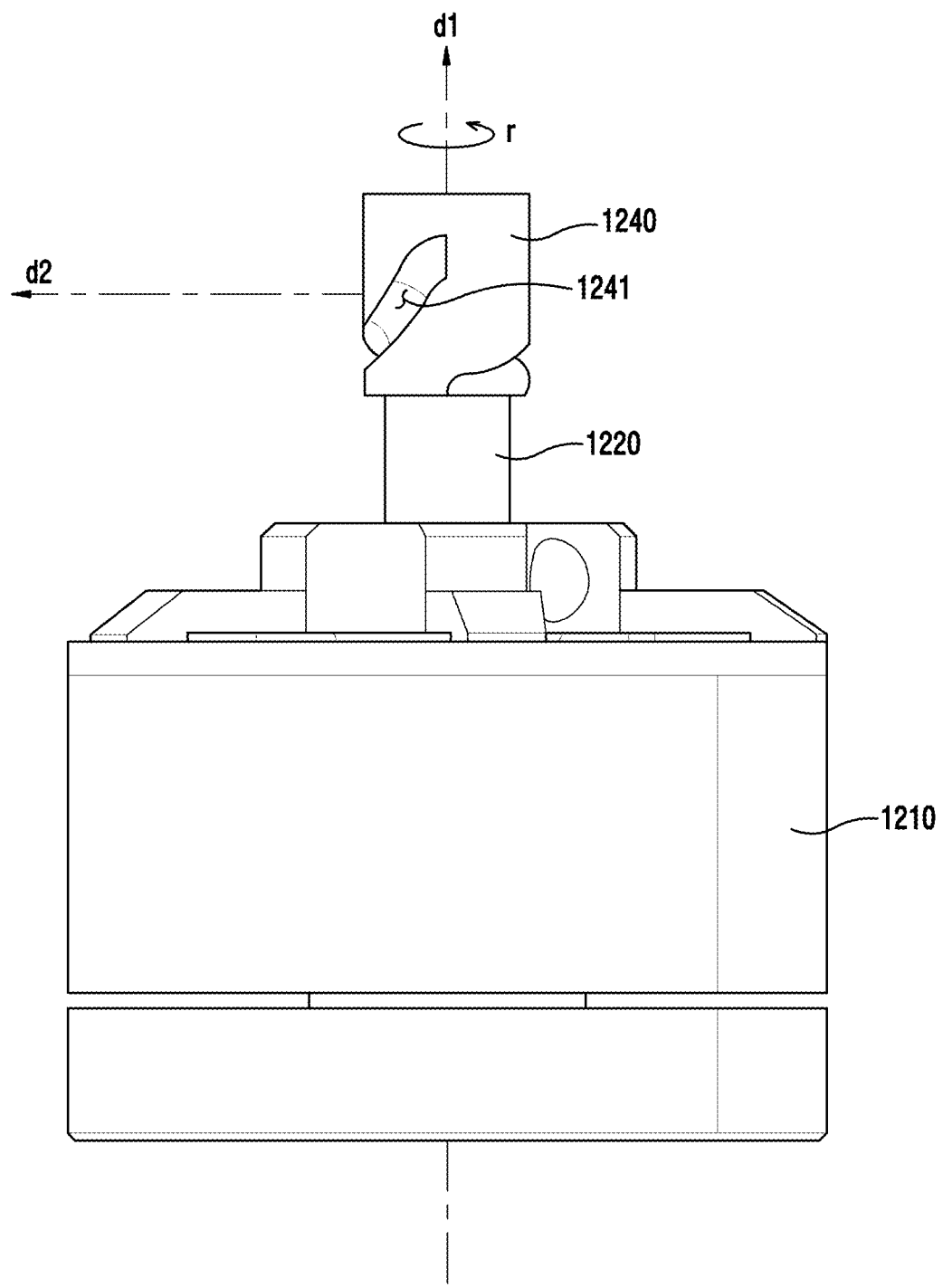
FIG. 12B is a front view showing the propulsion system with a motor, a rotation shaft, and a cap structure assembled according to various embodiments.
Figure 12C:
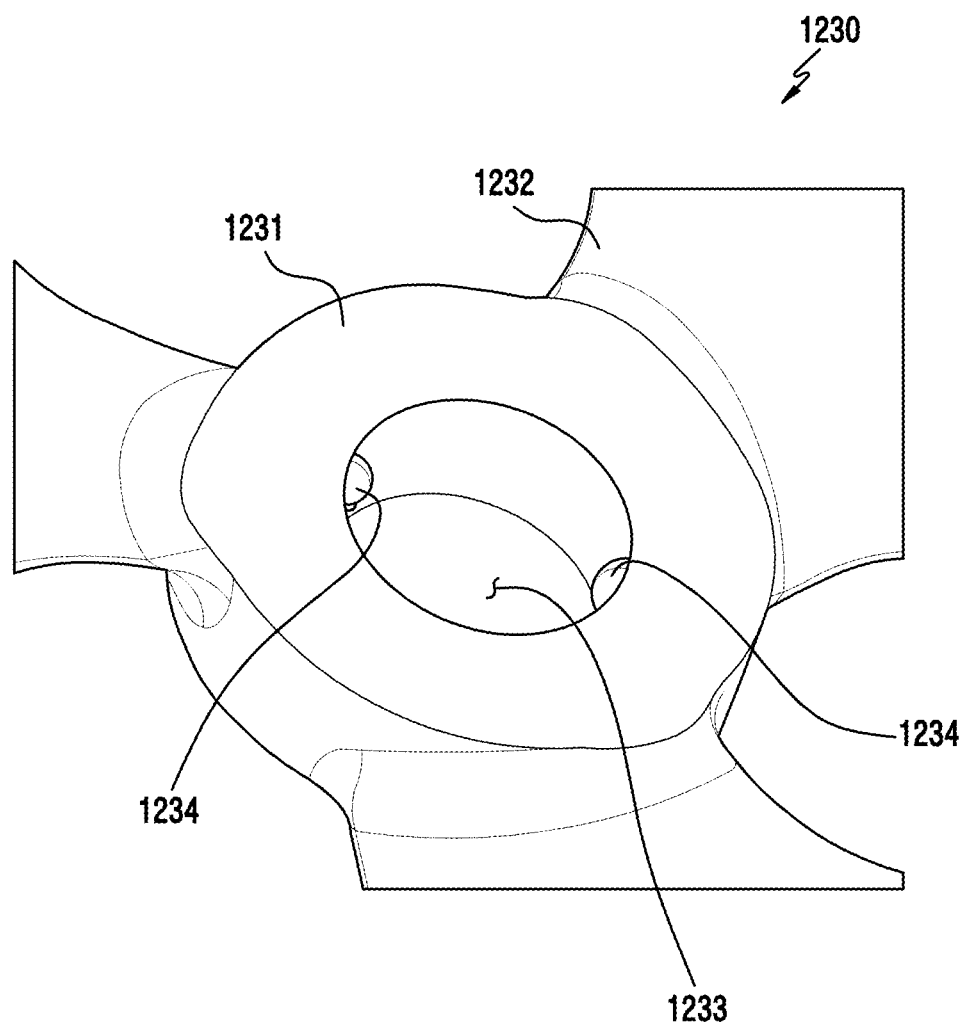
FIG. 12C is a partial enlarged view of the propeller according to various embodiments.
Figure 12D:
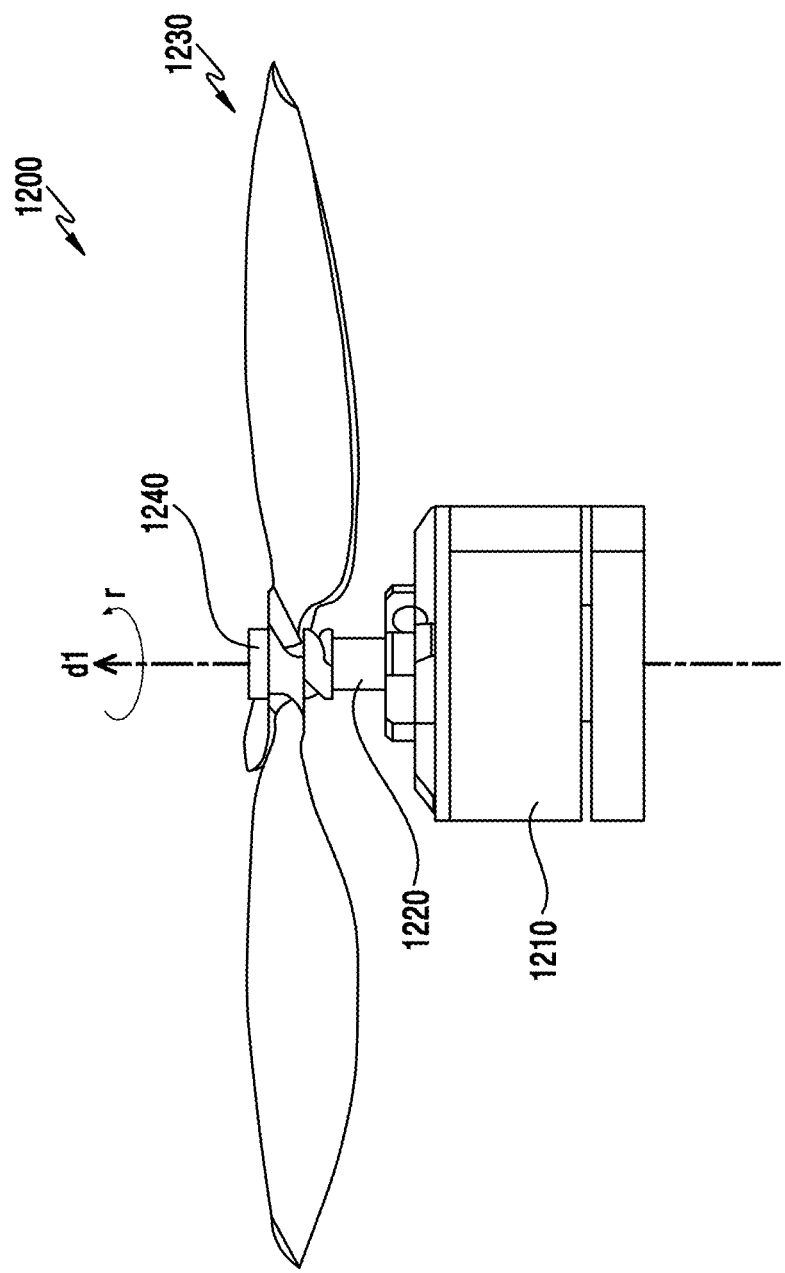
FIG. 12D is a perspective view showing the propulsion system completely assembled, according to various embodiments.

FIG. 12A is an exploded view of a propulsion system according to another embodiment. FIG. 12B is a front view showing the propulsion system with a motor, a rotation shaft, and a cap structure assembled according to various embodiments. FIG. 12C is a partial enlarged view of the propeller according to another embodiment. FIG. 12D is a perspective view showing the propulsion system completely assembled, according to another embodiment. A propulsion system according to another embodiment is described with reference to FIGS. 12A to 12D. A propulsions system 1200 shown in FIGS. 12A to 12D may constitute the propulsion systems 210 shown in FIG. 2.

Referring to FIG. 12A, a propulsion system 1200 according to another embodiment may include a motor 1210, a rotation shaft 1220, a propeller 1230, and a cap structure 1240.

According to an embodiment, the rotation shaft 1220 may be configured to be rotated in a rotational direction r by the motor 1210. For example, the rotation shaft 1220 may have a rod shape extending in a first direction d1 (or axial direction). An end of the rotation shaft 1220 may be connected to the motor 1210 such that torque from the motor 1210 is directly applied to the rotation shaft 1220 or is indirectly applied, for example, through a gear box etc.

The propeller 1230 according to an embodiment may have a hub 1231, a plurality of blades 1232, and a through-hole 1233 formed at the center of the hub 1231. The blades 1232 may be connected to the side of the hub 1231 with regular circumferential intervals. In the propeller 1230, the hub 1231 and the blades 1232 may be integrally formed, or the hub 1231 and the blades 1232 may be combined. The through-hole 1233 may be formed at the center of the hub 1231 such that the rotation shaft 1220 can be rotated therein. The propeller 1230 may be assembled such that the rotation shaft 1220 is inserted through the through-hole 1233. The through-hole 1233 may be configured to be larger in radius than the rotation shaft 1220 such that the propeller 1230 can be freely rotated without being restricted by rotation of the rotation shaft 1220.

Referring to FIG. 12B, the cap structure 1240 according to another embodiment may be fixedly coupled to the other end of the rotation shaft 1220. The cap structure 1240 may be configured to hold the propeller 1230 to prevent the propeller 1230 from being separated from the rotation shaft 1220. Accordingly, the cap structure 1240 may be referred to as a holder. The fixed coupling of the cap structure 1240 and the rotation shaft 1220 may be made by thread-fastening, snap-fitting, bonding, etc. that prevent them from being separated while the propulsion system 1200 is operated.

According to an embodiment, the cap structure 1240 may have at least one spiral recess 1241 on a side. For example, the cap structure 1240 may have at least spiral recess 1241 on the side facing a second direction d2 substantially perpendicular to an axial direction d1. The spiral recesses 1241 may have a spiral extending toward the motor 1210 in a second rotational direction opposite to a first rotational direction r of the rotation shaft 1220 and/or the cap structure 1240.

Referring to FIG. 12C, the propeller 1230 according to an embodiment may have at least one protrusion 1234 on the inner side of the through-hole 1233. The protrusions 1234 may protrude from the inner side of the through-hole 1233 toward the center of the through-hole 1233. The protrusions 1234 may be configured to be engaged in the spiral recesses 1241 of the cap structure 1240. The through-hole 1233 of the propeller 1230 has a radius allowing the cap structure 1240 to be inserted through the through-hole 1233, and the protrusions 1234 can be engaged in the spiral recesses 1241. According to an embodiment, the protrusions 1234 may be integrally formed with the hub 1231 or may be separately formed and then coupled to the hub 1231.

Referring to FIG. 12D, the propulsion system 1200 according to another embodiment may be completely assembled by combining the propeller 1230 with the cap structure 1240. For example, the propeller 1230 and the cap structure 1240 may be assembled such that the cap structure 1240 is inserted through the through-hole 1233 with the protrusions 1234 engaged in the spiral recesses 1241 of the cap structure 1240. The propeller 1230 assembled with the cap structure 1240 may be restricted relative to rotation of the cap structure 1240 not to freely move or rotate relative to the rotation shaft 1220.

The sequence of assembling the propulsion system 1200 according to an embodiment may be as follows. As a first step, the motor 1210 and the rotation shaft 1220 may be assembled. A first end of the rotation shaft 1220 may be coupled to the motor 1210 to be able to receive torque from the motor 1210. As a second step, the rotation shaft 1220 and the propeller 1230 may be assembled. The propeller 1230 may be assembled in a manner of inserting the rotation shaft 1220 into the through-hole 1233 of the hub 1231. As a third step, the cap structure 1340 and the rotation shaft 1220 may be assembled. The cap structure 1240 may be completely fixedly coupled to the other end of the rotation shaft 1220. As a fourth step, the propeller 1230 may be assembled to be restricted to the cap structure 1240. The propeller 1230 may be assembled by fastening the protrusions 1234 of the propeller 1230 to the spiral recesses 1241 of the cap structure 1240 and the moving them in a first direction d1 along the spirals of the spiral recesses 1241.

Figure 13A:
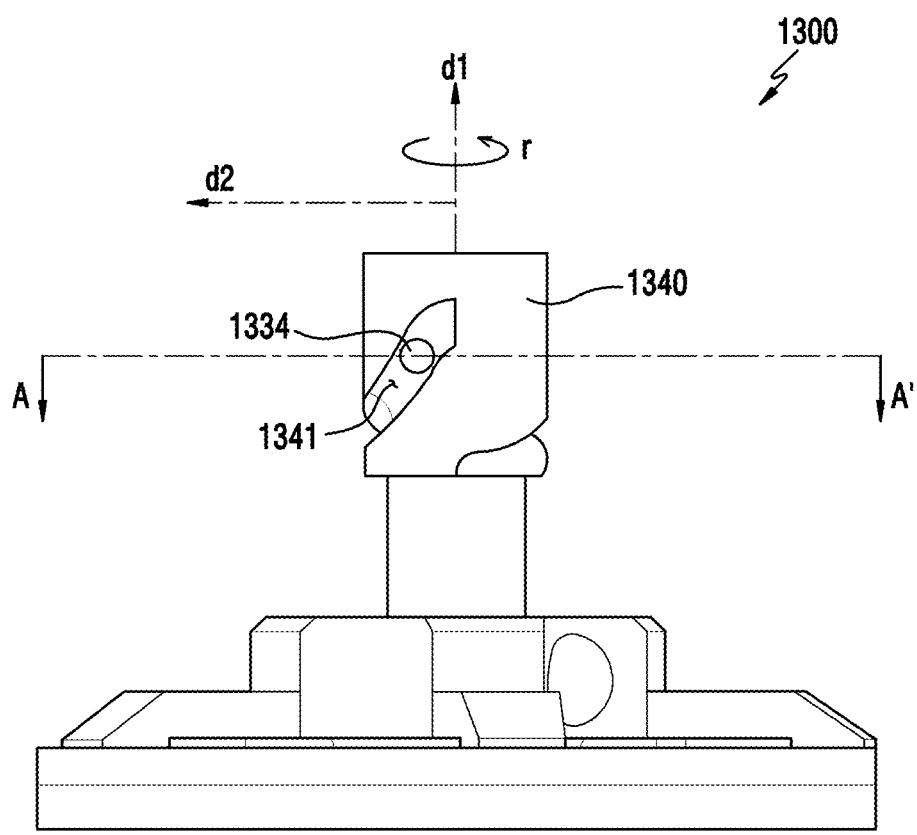
FIG. 13A is a front view showing a state in which a cap structure and a propeller are combined in a propulsion system according to various embodiments.
Figure 13B:
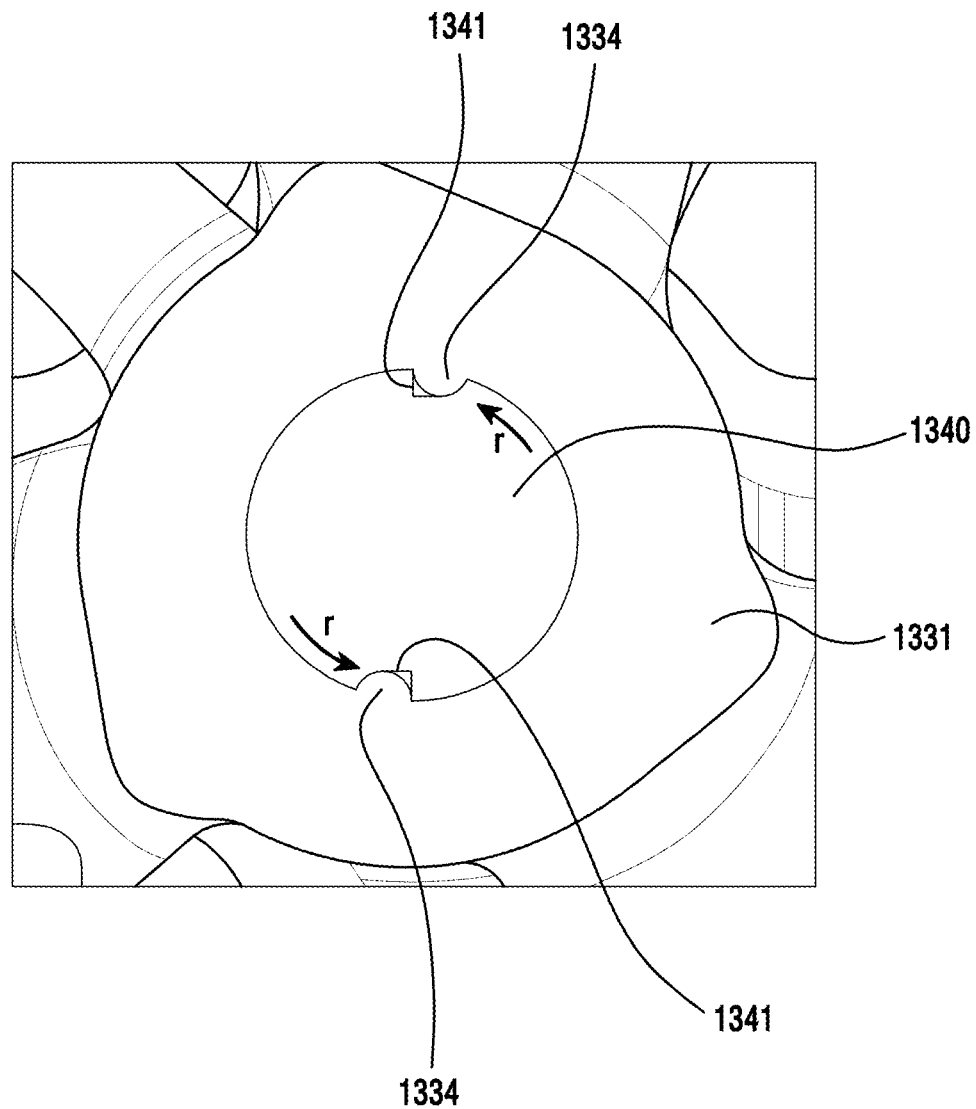
FIG. 13B is a partial cross-sectional view taken along line A-A' of the propulsion system shown in FIG. 13A.

FIG. 13A is a front view showing a state in which a cap structure and a propeller are combined in a propulsion system 1300 according to another embodiment. FIG. 13B is a partial cross-sectional view taken along line A-A' of the propulsion system shown in FIG. 13A.

Referring to FIG. 13A, protrusions 1334 of a propeller may be inserted and slidably fastened in spiral recesses 1341 of a cap structure 1340. As the protrusions 1334 slide in the spiral recesses 1341, the propeller is rotated in a first direction d1 and a rotational direction r relative to the cap structure 1340, whereby it can be assembled with the cap structure 1340. Referring to FIG. 13B, the protrusions 1334 engaged in the spiral recesses 1341 of the cap structure 1340 can provide a restriction force in the rotational direction r to the cap structure 1340 and the propeller having a hub 1331. For example, the protrusions 1334 can directly receive torque by the cap structure 1340 through the spiral recesses 1341. In other words, the protrusions 1334 of the hub 1331 may be configured to be at least partially inserted around the cap structure 1340 such that rotation of the propeller having the hub 1331 is restricted by the cap structure 1340.

Figure 14A:
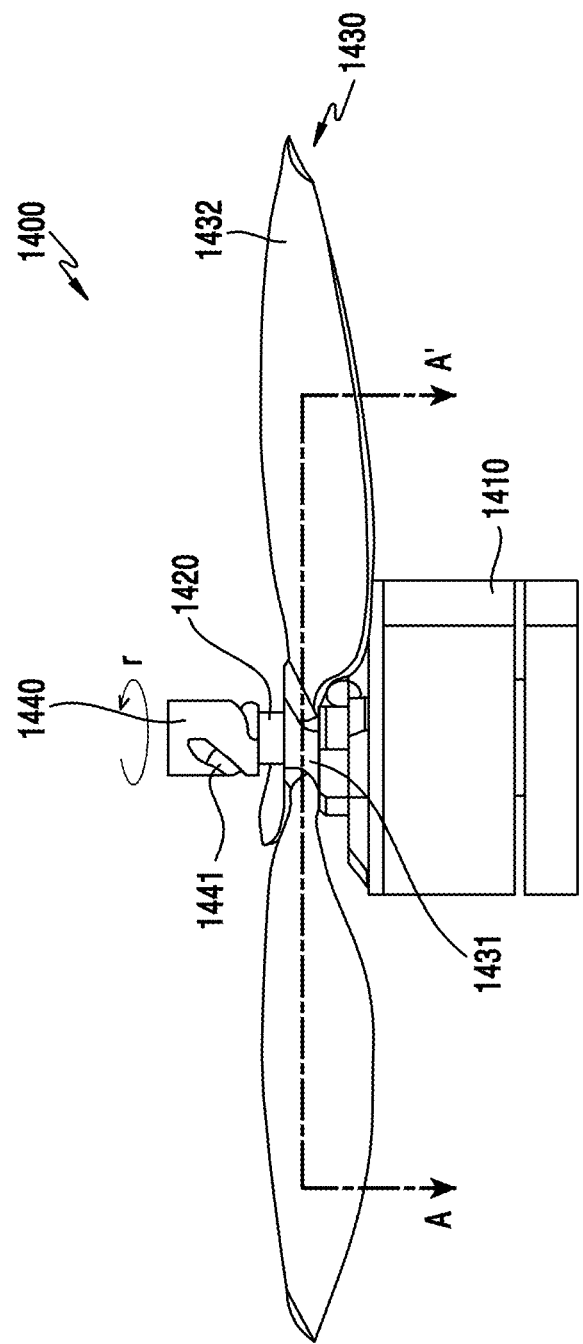
FIG. 14A is a front view showing a state in which a propeller and a cap structure are separated by an external force in a propulsion system according to various embodiments.
Figure 14B:
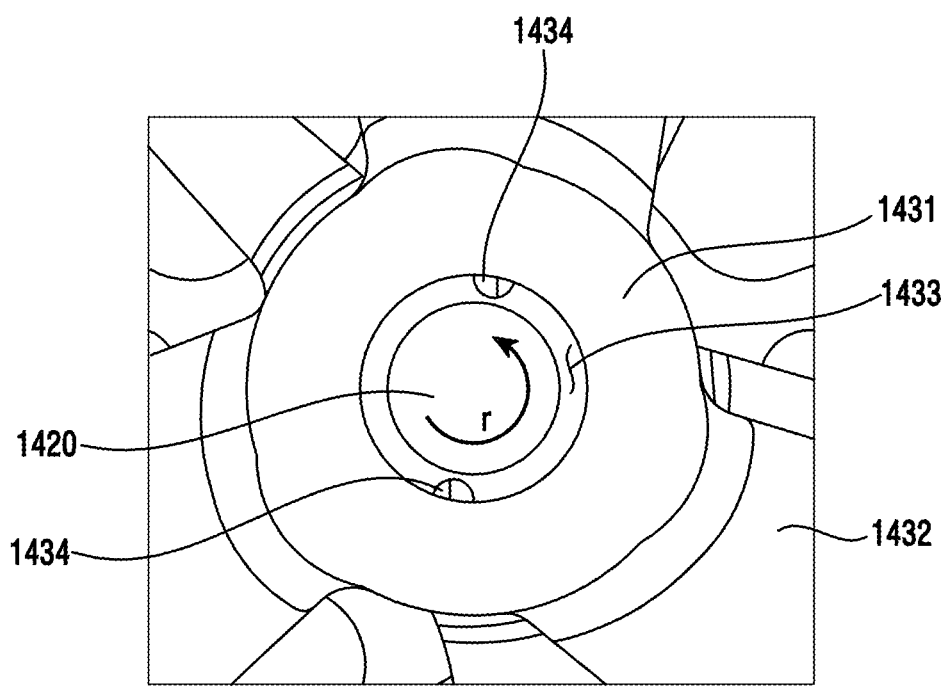
FIG. 14B is a partial cross-sectional view taken along line A-A' of the propulsion system shown in FIG. 14A.

FIG. 14A is a front view showing a state in which a propeller and a cap structure are separated by an external force in a propulsion system 1400 according to another embodiment. FIG. 14B is a partial cross-sectional view taken along line A-A' of the propulsion system shown in FIG. 14A.

Referring to FIG. 14A, a propeller 1430 may include a hub 1431 and a plurality of blades 1432 extended from the hub 1431. The hub 1431 may include a through-hole (not shown) formed at the center of the hub 1431, and a rotation shaft 1420 may be coupled to the hub 1431 via the through-hole.

a propeller 1430 separated from a cap structure 1440 can be stopped without being restricted by torque of a motor 1410 and a rotation shaft 1420. The propeller 1430 and the cap structure 1440 can be separated when rotation of the propeller 1430 is interrupted by a person or an obstacle positioned in an axial direction and/or a rotational direction. For example, an external force may be applied to blades 1432 due to interference by an obstacle in the rotation area of the propeller 1430 and rotation of the propeller 1430 may be stopped. Even though rotation of the propeller 1430 is stopped, the cap structure 1440 transmitting torque from the motor 1410 to the propeller 1430 intends to keep rotating in the rotational direction r, so the propeller 1430 can be rotated in the opposite direction to the rotational direction r relative to the cap structure 1440. As the propeller 1430 is rotated in the opposite direction, the protrusions 1434 can slide in the opposite direction along the spirals of the spiral recesses 1441. When the propeller 1430 is rotated in the opposite direction along the spirals of the spiral recesses 1441, it can be separated from the cap structure 1440. Accordingly, when the propeller 1430 is rotated in the opposite direction to the rotational direction r relative to the cap structure 1440 by an external force caused by an obstacle etc., the protrusions 1434 are separated out of the spiral recesses 1441 and the propeller 1430 is separated from the cap structure 1440, so torque that is applied to the propeller 1430 may be stopped. If the torque that is applied to the propeller 1430 is not stopped, the propeller 1430 that intends to keep rotating may damage to the blades 1432 and/or the obstacle. Accordingly, the mechanism that stops torque that is applied to the propeller 1430 can provide a safe propulsion system that prevents damage (injury) to an obstacle (a person) or the blades.

Figure 15:
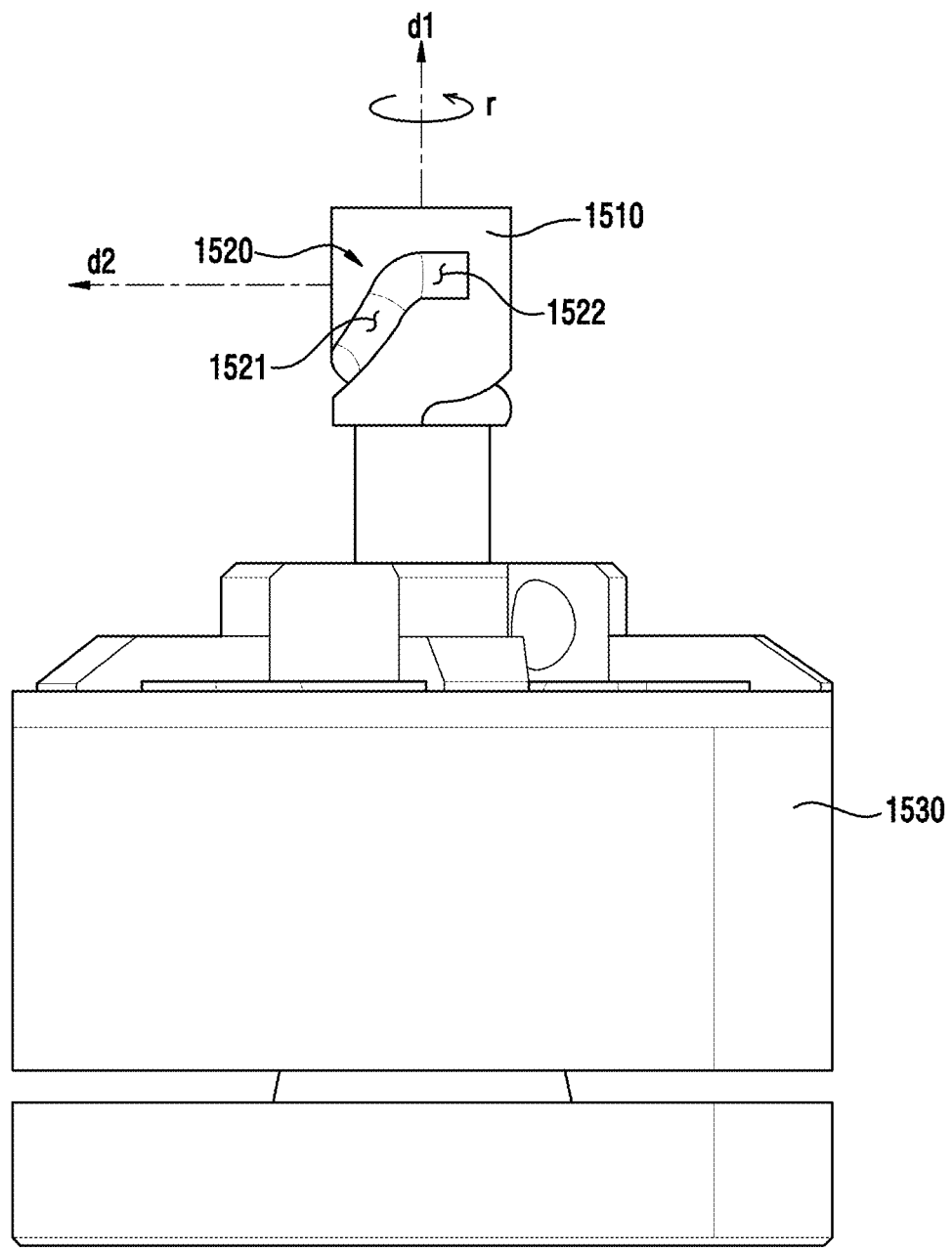
FIG. 15 is a front view showing a cap structure according to various embodiments.

FIG. 15 is a front view showing a cap structure according to another embodiment.

Referring to FIG. 15, a cap structure 1510 according to another embodiment may have at least one spiral recess 1520 on a side. For example, the spiral recesses 1520 may be formed on the side facing a second direction d2 substantially perpendicular to an axial direction d1 of the cap structure 1510. The spiral recesses 1520 may have spiral portions 1521 extending toward a motor 1530 in a second rotational direction opposite to a first rotational direction r1. An end of the spiral portion 1521 may be open at the lower end of the cap structure 1510 and the other end may extend to have a horizontal portion 1522 substantially parallel in the second direction d2. The horizontal portions 1522 can seat the protrusions of the propeller on the horizontal portions 1522. Since the protrusions of the propeller are seated on the horizontal portions 1522, the propeller can be prevented from separating from the cap structure 1510 by the weight of the propeller even though the propeller has not been rotated.

Figure 16A:
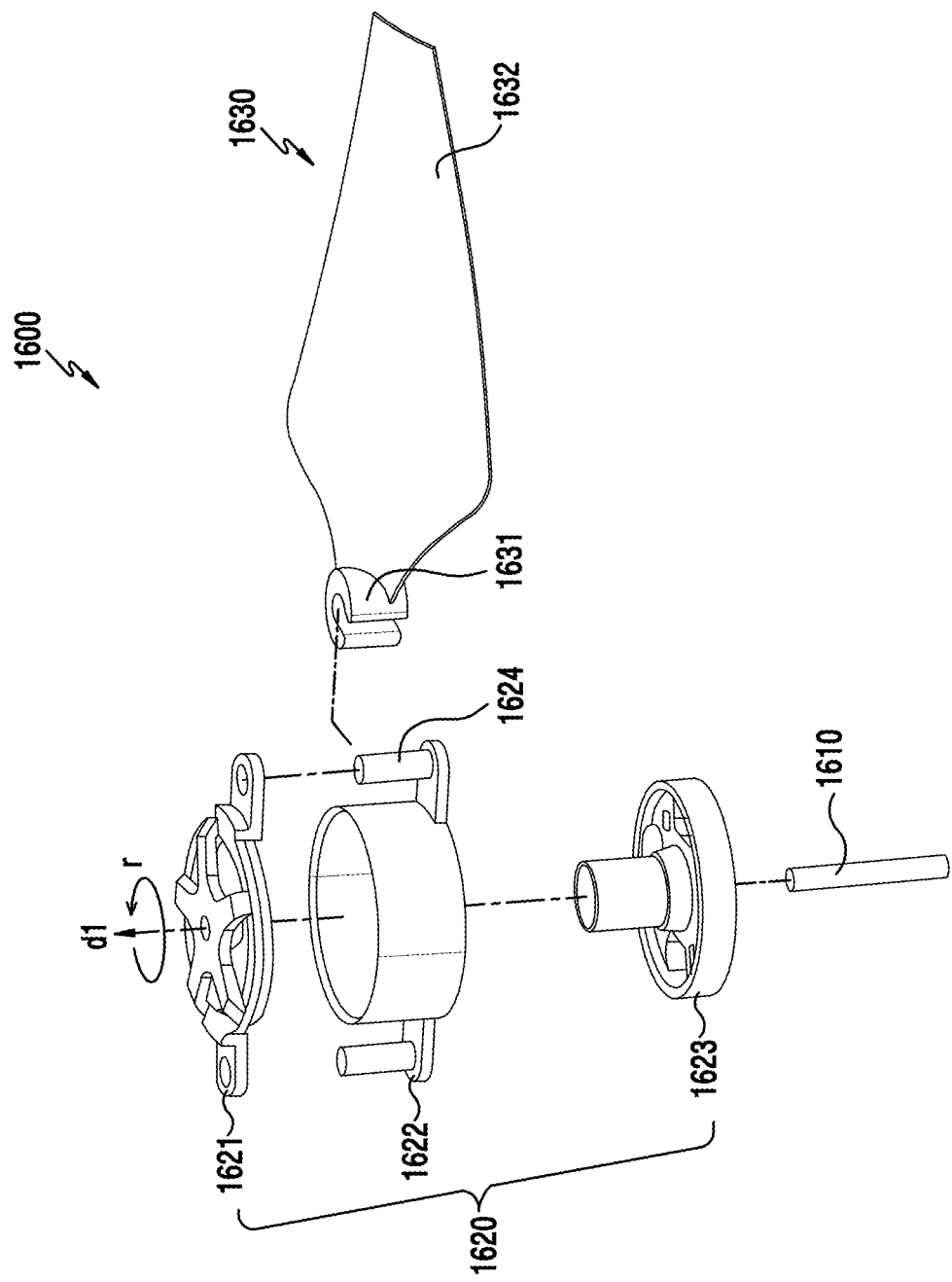
FIG. 16A is an exploded view of a propulsion system according to various embodiments.
Figure 16B:
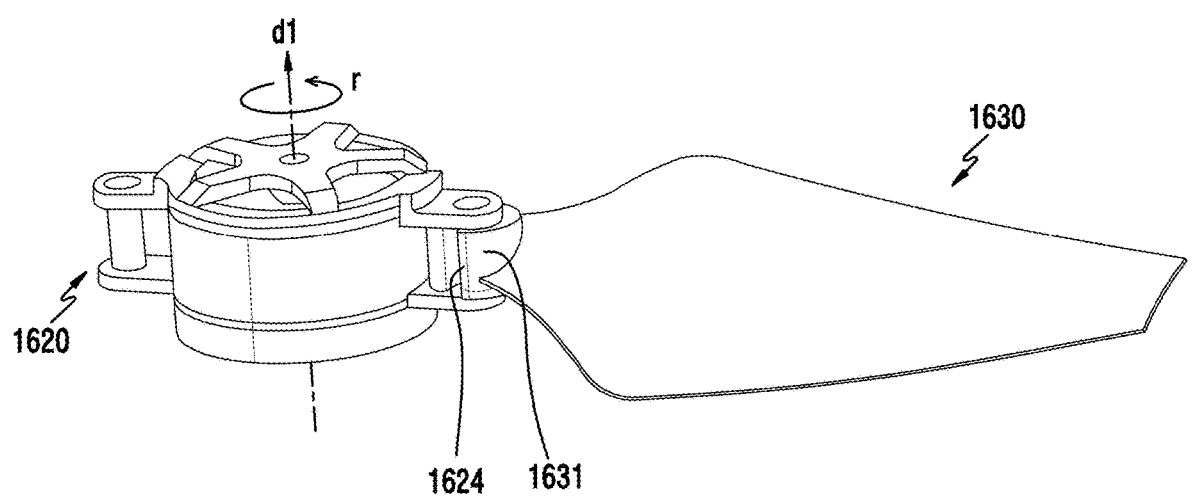
FIG. 16B is a perspective view showing the propulsion system completely assembled, according to various embodiments.

FIG. 16A is an exploded view of a propulsion system according to another embodiment. FIG. 16B is a perspective view showing the propulsion system completely assembled, according to another embodiment. A propulsion system according to another embodiment is described with reference to FIGS. 16A and 16B. A propulsions system 1600 shown in FIGS. 16A to 16B may constitute the propulsion systems 210 shown in FIG. 2.

Referring to FIGS. 16A and 16B, the propulsion system 1600 according to another embodiment may include a motor (not shown), a rotation shaft 1610, a hub 1620 and a plurality of blades 1630. The rotation shaft 1610 may be connected to the motor to receive torque from the motor and fixedly coupled to a hub 1620. According to an embodiment, a structure including the hub 1620 and the plurality of blades 1630 may be referred to as a propeller.

According to an embodiment, the hub 1620 may include a first hub 1621, a second hub 1622, and a third hub 1623. For example, the hub 1620 may be a single unit or an assembly of the first hub 1621, second hub 1622, and third hub 1623. According to an embodiment, the first hub 1621 and the third hub 1623 may be fixedly coupled to the rotation shaft 1610 to receive torque from the motor. According to an embodiment, the second hub 1622 may be formed in a cylindrical shape having a radius larger than that of the rotation shaft 1610. Accordingly, the second hub 1622 can receive torque from the motor not directly through the rotation shaft 1610, but through the first hub 1621 and/or the third hub 1623 fixedly coupled to the rotation shaft 1610.

The each blade 1630 according to an embodiment may have a fastening portion 1631 and a wing 1632 with a wing angle. The fastening portion 1631 is formed at an end of the wing 1632 and connected to the hub 1620, so the each blade 1630 can be rotated with the hub 1620. The blades 1630 may be connected to the side of the hub 1620 with predetermined or more circumferential intervals. For example, the second hub 1622 may have one or more fastening pins 1624 arranged circumferentially with regular intervals around the side thereof. The fastening portion 1631 of the each blade 1630 may be rotatably coupled to the fastening pins 1624. Alternatively, the fastening portions 1631 and the fastening pins 1624 may be configured in a snap-fit structure. For example, the fastening portions 1631 may be formed in a hook shape configured to cover at least a portion of the fastening pins 1624. The inlet of the fastening portions 1631 may be configured to be smaller than the diameters of the fastening pins 1624. Accordingly, in a predetermined situation, the snap-fitted fastening portions 1631 and the fastening pins 1624 can be separated, so the blades 1630 can be separated from the hub 1620.

Figure 17A:
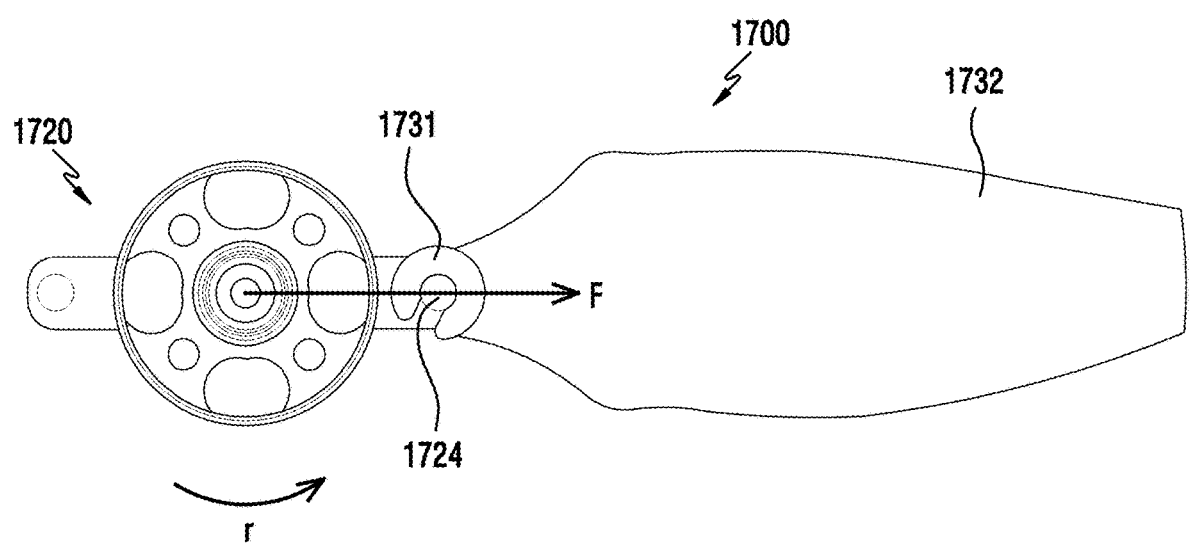
FIG. 17A is a plan view of a rotating propeller of a propulsion system according to various embodiments.
Figure 17B:
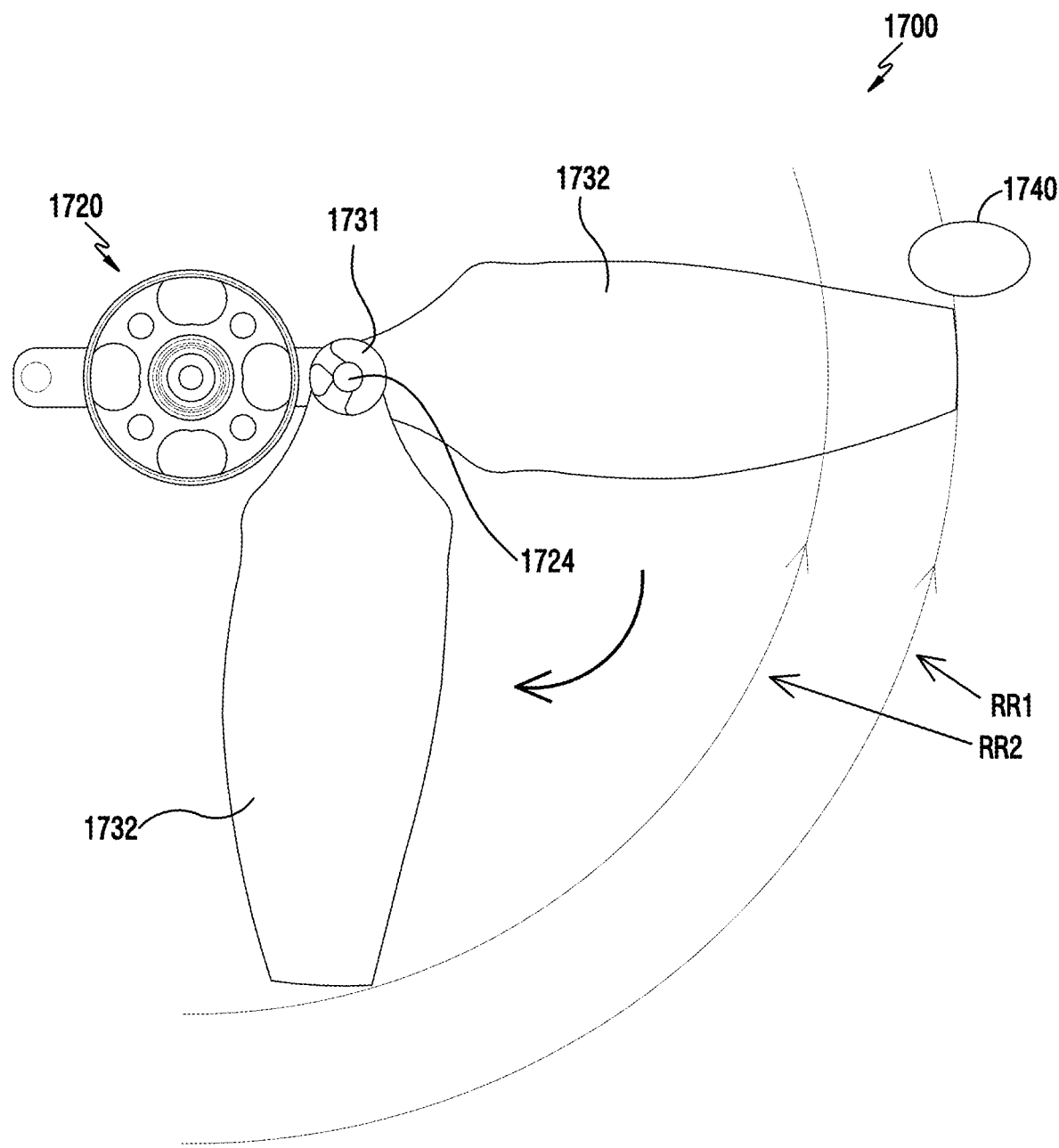
FIG. 17B shows a state of a blade that is changed by an external force due to interference by an obstacle in the rotation area of the rotating rotary propeller of the propulsion system according to various embodiments.
Figure 17C:
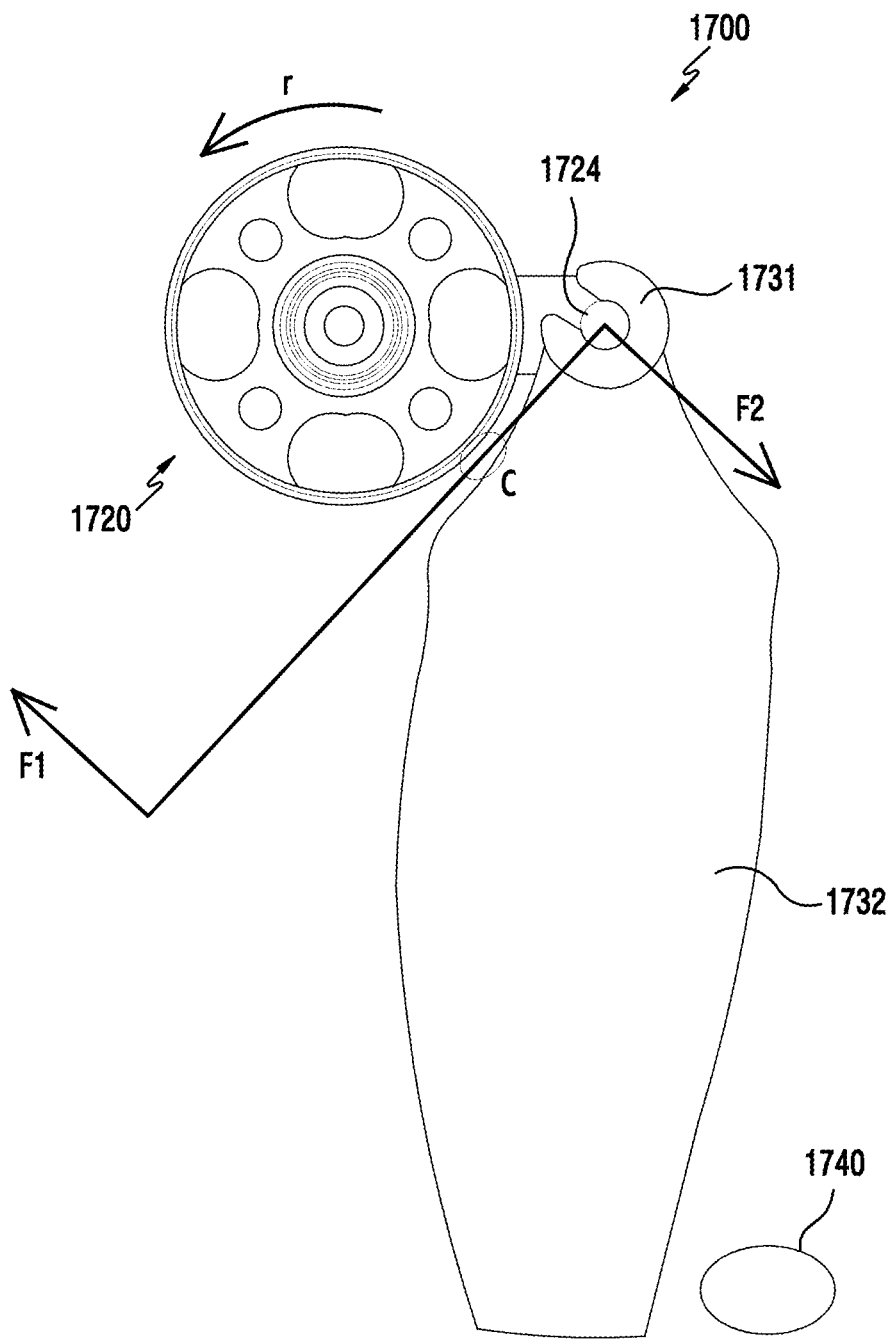
FIG. 17C shows a state in which a blade of the propulsion system according to various embodiments is separated from a hub by an external force.

FIG. 17A is a plan view of a propeller of a propulsion system according to another embodiment. FIG. 17B shows a state of a blade that is changed by an external force due to interference by an obstacle in the rotation area of the propeller of the propulsion system according to another embodiment. FIG. 17C shows a state in which a blade of the propulsion system according to another embodiment is separated from a hub by an external force. A mechanism in which a blade of the propeller is separated from a hub when an obstacle interferes with the rotary propeller 1700 of a propulsion system according to another embodiment is described with reference to FIGS. 17A, 17b and 17C.

Referring to FIG. 17A, the propeller 1700 may include a hub 1720 and a plurality of wings 1732 coupled to the hub 1720. The hub 1720 according to another embodiment may be configured to be rotated with the wings 1732 connected to the hub 1720 when it is rotated in a rotational direction r in a normal operation state. A centrifugal force F may be applied to a fastening portion 1731 (e.g., the fastening portion 1631 in FIG. 16a) and a wing 1732 (e.g., the wing 1632 in FIG. 16a) relative to the hub 1720. The wings 1732 can be rotated substantially in the direction of the centrifugal force F.

Referring to FIG. 17B, the each wing 1732 according to another embodiment may be configured to rotate on a fastening pin 1724 relative to the hub 1720 when an external force is caused by an interfering obstacle 1740 in the rotation area. For example, the wing 1732 rotating with a first rotational radius RR1 can be rotated toward the hub on the fastening pin 1724 by the obstacle 1740. That is, the wing 1732 can be changed to rotate with a second rotational radius RR2 smaller than the first rotational radius RR1.

According to an embodiment, when the interference by the obstacle 1740 is removed, the wing 1732 rotating with the second rotational radius RR2 can be returned to rotate with the first rotational radius RR1 by the centrifugal force F. Accordingly, the mechanism can provide a safe propulsion system that can prevent damage to an obstacle or blades against temporary interference by the obstacle and that can be returned into the normal operation state.

Referring to FIG. 17C, the wing 1732 according to another embodiment may be configured to be separated from the hub 1720 when interference by an obstacle continues. For example, the wing 1732 may have a contact point C on the hub 1720 while rotating with the second rotational radius RR2 due to interference by the obstacle 1740. The continuous interference by the obstacle 1740 may generate a leverage force F1 that causes an action force F2 on the fastening portion 1731 at the contact point C. The leverage force F1 and the action force F2 may be generated in opposite directions at the contact point C. The action force F2 can act such that the fastening portion 1731 is separated from the fastening pin 1724. In other words, when the obstacle 1740 interferes with the wing 1732, torque of the hub 1720 in a rotational direction r can generate the leverage force F1 that causes the action force F2 that separates the fastening portion 1731 from the fastening pin 1724 with the contact point C as the fulcrum.

According to an embodiment, the action force F2 can unlocks the snap-fit structure of the fastening portion 1731 and the fastening pin 1724. Accordingly, the wing 1732 can be separated from the hub 1720. Therefore, the mechanism that separates the wings 1732 from the hub 1720 can provide a safe propulsion system that can prevent damage to an obstacle or blades even against continuous interference by the obstacle.

Figure 18B:
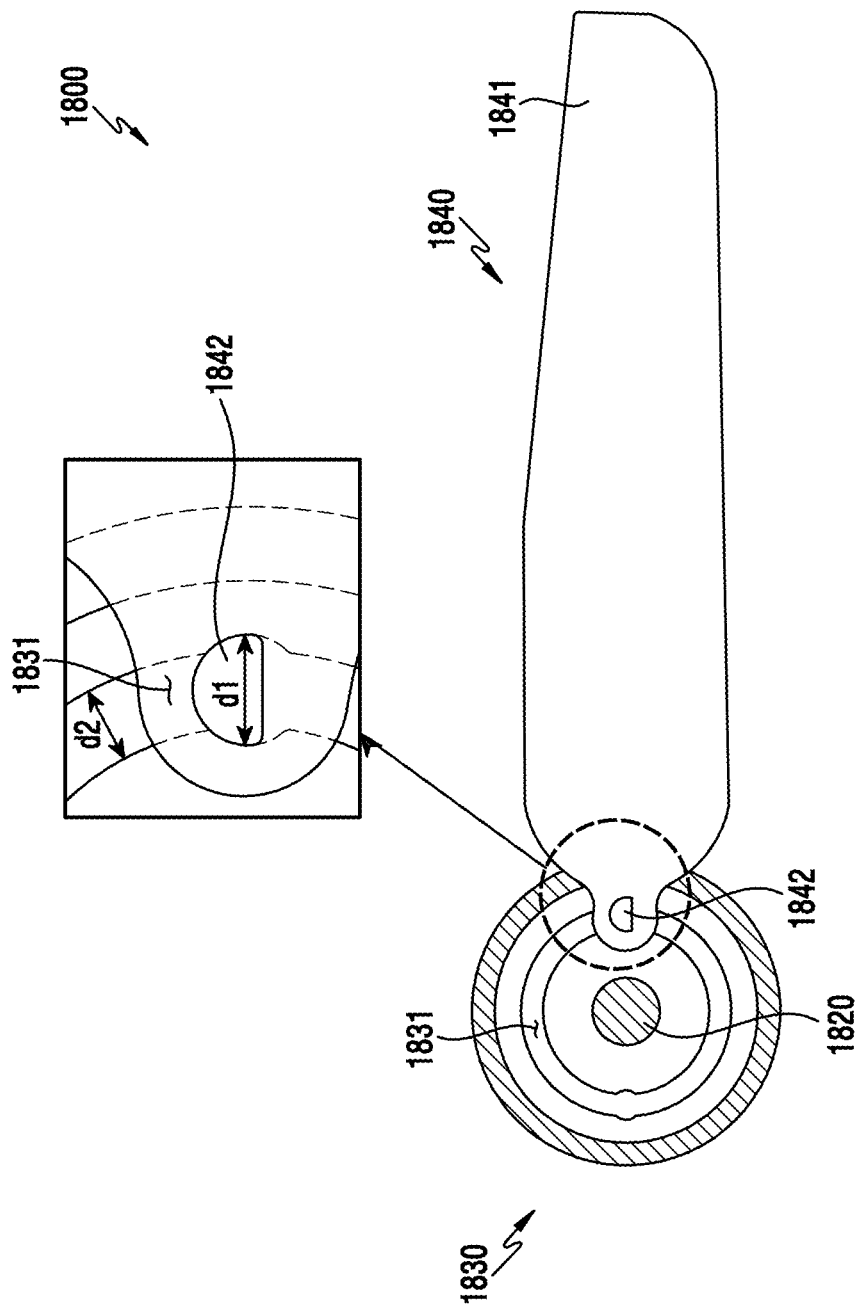
FIG. 18B is a plan view showing a state in which a blade of the propulsion system according to various embodiment is locked in a rail.

FIG. 18A is a front view of a propulsion system further including guide rails according to another embodiment. FIG. 18B is a plan view showing a state in which a blade of the propulsion system according to another embodiment is locked in a rail. A propulsion system according to another embodiment is described with reference to FIGS. 18A and 18B. A propulsions system 1800 shown in FIGS. 18A and 18B may constitute the propulsion systems 210 shown in FIG. 2.

Referring to FIG. 18A, the propulsion system 1800 according to another embodiment may include a motor 1810, a rotation shaft 1820 configured to be rotated by a motor 1810, a hub 1830 fixedly coupled to the rotation shaft

1820, and a plurality of blades 1840 connected to the hub 1830. The blades 1840 each may have a wing 1841 with a wing angle and a connecting portion 1842 configured to be connected to the hub 1830. The connecting portion 1842 according to an embodiment may have a protrusion shape protruding from the top and/or the bottom of an end of the blade 1840. According to an embodiment, a structure including the hub 1830 and the plurality of blades 1840 may be referred to as a propeller.

Referring to FIG. 18B, the connecting portion 1842 according to an embodiment may have a protrusion shape having a semicircular or arc-shaped cross-section. The diameter of the protrusions shape may have a first distance d1. The hub 1830 according to an embodiment may have a guide rail 1831 formed along a circumference larger in radius than the rotation shaft 1820. The guide rail 1831 may be configured such that the protrusion shape of the connecting portion 1842 of the blade 1840 can be inserted therein. The guide rail 1831 may have a width corresponding to a second distance d2 generally smaller than the first distance d1. At least a portion (or points where the blades 1840 are connected) of the guide rail 1831 may include a circular shape substantially having a diameter corresponding to the first distance d1 such that the connecting portions 1842 of the blades 1840 can be inserted therein.

Figure 19A:
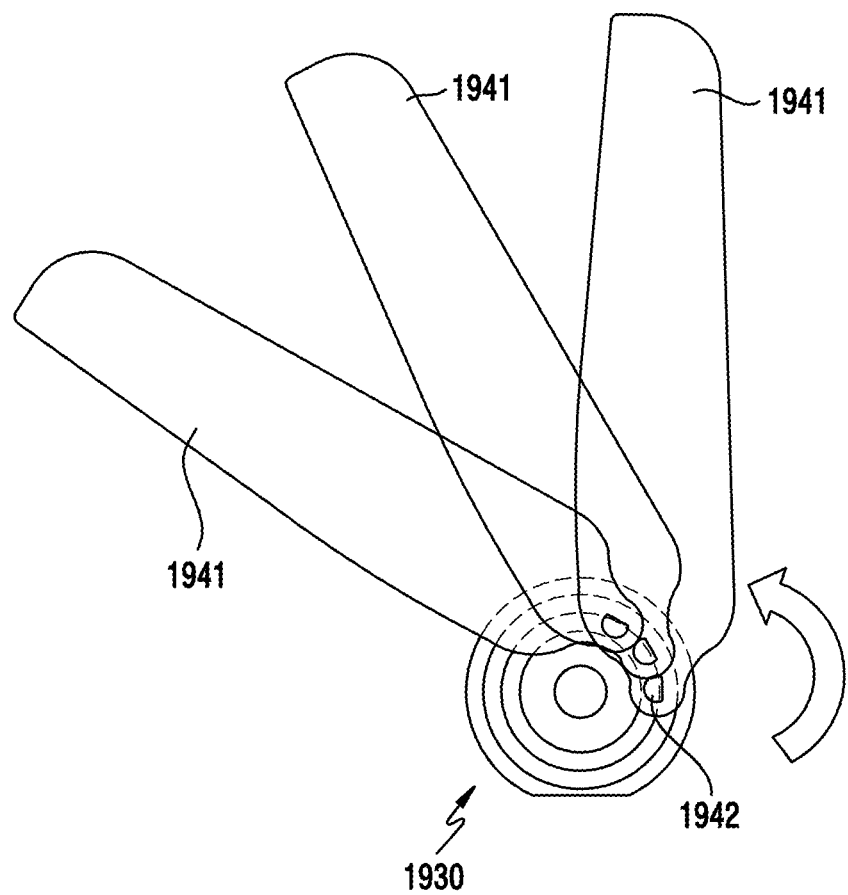
FIG. 19A shows a state of a blade that is changed by an obstacle in the rotation area in a propulsion system according to various embodiments.
Figure 19B:
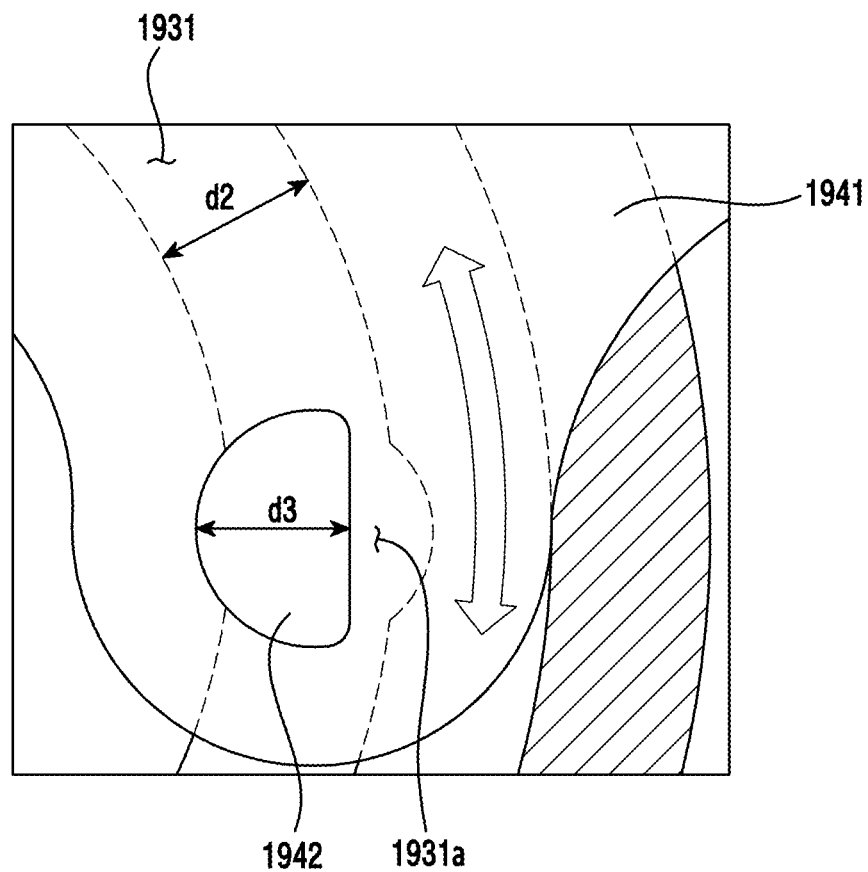
FIG. 19B is a plan view showing a state in which a blade of the propulsion system according to various embodiments can be freely moved along a guide rail.

FIG. 19A shows a state of a blade that is changed by an obstacle in the rotation area in a propulsion system according to another embodiment. FIG. 19B is a plan view showing a state in which a blade of the propulsion system according to another embodiment can be freely moved along a guide rail.

Referring to FIGS. 19A and 19B, blades 1941 according to another embodiment may be configured to rotate on connecting portions 1942 relative to a hub 1930 when an external force is caused by an interfering obstacle in the rotation area. For example, the guide rail 1931 of the hub 1930 may be configured to have a circular shape 1931a such that a connecting portion 1942 can be inserted in at least one point. The connecting portion 1942 can be rotated in the circular shape 1931a. The rotated connecting portion 1942 may have a width d3 equal to or smaller than width having the second distance d2 of the guide rail 1931. According to an embodiment, the connecting portion 1942 rotated by an external force can be slid in the guide rail 1931 by rotation of the hub 1930. Accordingly, the connecting portion 1942 rotated due to continuous interference by an obstacle in the rotation area of the blade 1941 slides along the guide rail 1931 even though the hub 1930 is rotated, whereby it is possible to prevent damage to the obstacle or the blade 1941.

An unmanned aerial vehicle (UAV) according to an embodiment includes: a housing; a wireless communication circuit positioned inside or connected to the housing, wherein the communication circuit is configured to establish wireless communication with an external controller; a plurality of propulsion systems connected to or at least partially embedded in the housing; and a navigation circuit configured to control the propulsion systems, wherein at least one of the plurality of propulsion systems includes: a motor controlled by the navigation circuit; a rotation shaft having an axis extending in a first direction, and including a first end and a second end, wherein the first end is connected to the motor, and wherein the rod is configured to be rotated in a first rotational direction by the motor; a cap structure fixed to the second end of the rod, a propeller including: a hub including a through-hole formed in the first direction, such that the rod rotatably passes through the through-hole; and a plurality of blades connected to the hub in second directions substantially perpendicular to the first direction, wherein the propeller is detachably fixed to or connected to the cap structure, such that, when an external force is exerted on at least one of the blades, the propeller is released from the cap structure to be freely movable along the axis toward the motor.

The cap structure according to various embodiments may include a surface facing toward the propeller, and at least one spiral recess formed in the surface, and wherein the hub may include at least one protrusion slidably engaged in the spiral recess when the propeller is connected to the cap.

The spiral recess according to various embodiments may extend toward the propeller in a second rotational direction opposite from the first rotational direction.

The protrusion according to various embodiments may include an inclined portion further protruding from the hub in the first rotational direction, and as the protrusion slides in the spiral recess, the propeller may be separated from the cap structure by the inclined portion.

At least one of the propulsion systems according to various embodiments may include a coupling structure configured to apply a predetermined force to the propeller in the first direction such that the propeller is not separated from the cap structure.

The coupling structure according to various embodiments may be composed of a surface, which faces the propeller, of the cap structure, magnets disposed on the surface, and metallic portions disposed at positions corresponding to the magnets on the hub.

The coupling structure according to various embodiments may be configured by a spring fitted on the rotation shaft between the hub and the motor.

The cap structure according to various embodiments may have a surface facing in the second direction and at least one spiral recess formed on the surface, and the hub may have at least one protrusion slidably engaged in the spiral recess when the propeller is rotated.

The spiral recess according to various embodiments may extend toward the motor in a second rotational direction opposite from the first rotational direction.

The protrusion according to various embodiments may be disposed on the inner side of the through-hole.

When the protrusion according to various embodiments is separated from the lower end, which extends toward the motor, of the spiral recess by sliding, the propeller may be separated from the cap structure.

The cap structure according to various embodiments may further have a horizontal recess extending in the first rotational direction from the upper end of the spiral recess on the surface.

A propulsion system according to various embodiments includes: a motor; a rotation shaft having a first end and a second end connected to the motor and extending in a first direction to be rotated in a first rotational direction by the motor; a cap structure fixed to the second end of the rotation shaft; and a propeller including a hub having a through-hole formed in the first direction such that that rotation shaft can be rotated therein, and a plurality of blades connected to the hub in a second direction substantially perpendicular to the first direction, wherein the propeller may be configured to be fixed or connected to the cap structure, and to be separated from the cap structure by rotating in a second rotational direction opposite to the first rotational direction relative to the cap structure when rotation of the blades is stopped by an external force.

The cap structure according to various embodiments may have at least one spiral recess each having a first surface coming in contact with the propeller when the cap structure is coupled to the propeller, and at least one recess formed on the surface, and the hub may have a second surface coming in contact with the cap structure when the propeller is coupled to the cap structure, and at least one protrusion slidably engaged in the spiral recess on the second surface.

The protrusion according to various embodiments may have a first inclined portion rising in the first rotational direction.

The spiral recess according to various embodiments may have a second inclined portion corresponding to the first inclined portion such that the propeller and the cap structure come in close contact with each other when being coupled.

The propeller according to various embodiments may be configured to be slid down toward the motor relative to the cap structure by the first inclined portion when rotation of the blades is stopped and the propeller slides in a second rotational direction relative to the cap structure.

The cap structure according to various embodiments may have a surface facing in the second direction and at least one spiral recess formed on the surface, and the hub may have at least one protrusion configured to be slidably engaged in the spiral recess when the propeller is rotated.

The protrusion according to various embodiments may be disposed on the inner side of the through-hole.

When the protrusion according to various embodiments is separated from the lower end, which extends toward the motor, of the spiral recess by sliding, the propeller may be separated from the cap structure.

The unmanned aerial vehicle according to various embodiments can provide safety when a user operates the unmanned aerial vehicle, using propulsion systems in which torque from motors is not applied to propellers when an external force is applied to the propellers.

The unmanned aerial vehicle according to various embodiments can further contribute to improving flying performance and popularizing unmanned aerial vehicles by improving portability by reducing the weight by removing a safety guard, in addition to providing safety.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory) in the form of a program module. The instruction, when executed by a processor (e.g., the processor), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Although the present disclosure has been described with various embodiments, various changes and modifications may be suggested to one skilled in the art. It is intended that the present disclosure encompass such changes and modifications as fall within the scope of the appended claims.

What is claimed is:

1. An unmanned aerial vehicle (UAV) comprising:
  a housing;
  a wireless communication circuit positioned inside or connected to the housing, wherein the wireless communication circuit is configured to establish wireless communication with an external controller;
  a plurality of propulsion systems connected to or at least partially embedded in the housing; and
  a navigation circuit configured to control the propulsion systems,
  wherein at least one of the plurality of propulsion systems includes:
    a motor controlled by the navigation circuit;
    a rotation shaft having an axis extending in a first direction, and including a first end and a second end, wherein the first end is connected to the motor, and wherein the rotation shaft is configured to be rotated in a first rotational direction by the motor;
    a cap structure fixed to the second end of the rotation shaft; and
    a propeller including:
      a hub including a through-hole formed in the first direction, such that the rotation shaft rotatably passes through the through-hole; and
      a plurality of blades connected to the hub in second directions substantially perpendicular to the first direction,
  wherein the propeller is detachably fixed to or connected to the cap structure, such that, when an external force is exerted on at least one of the blades, the propeller is released from the cap structure to be freely movable along the axis toward the motor,
  wherein the cap structure includes a surface facing toward the propeller, and at least one spiral recess formed in the surface,
  wherein the hub includes at least one protrusion slidably engaged in the at least one spiral recess when the propeller is connected to the cap structure,
  wherein at least one of the propulsion systems includes a coupling structure configured to apply a predetermined force to the propeller in the first direction such that the propeller is not separated from the cap structure, and
  wherein the coupling structure is composed of a surface, which faces the propeller, of the cap structure, magnets disposed on the surface, and metallic portions disposed at positions corresponding to the magnets on the hub.

2. The UAV of claim 1, wherein the at least one spiral recess extends toward the propeller in a second rotational direction opposite from the first rotational direction.

3. The UAV of claim 1, wherein:
  the at least one protrusion includes an inclined portion further protruding from the hub in the first rotational direction, and as the at least one protrusion slides in the at least one spiral recess, the propeller is separated from the cap structure by the inclined portion.

4. A propulsion system comprising:
a motor;
a rotation shaft having a first end and a second end connected to the motor and extending in a first direction to be rotated in a first rotational direction by the motor;
a cap structure fixed to the second end of the rotation shaft; and
a propeller including:
   a hub having a through-hole formed in the first direction such that that rotation shaft can be rotated therein, and
   a plurality of blades connected to the hub in a second direction substantially perpendicular to the first direction,
wherein the propeller is configured to be fixed or connected to the cap structure, and to be separated from the cap structure by rotating in a second rotational direction opposite to the first rotational direction relative to the cap structure when rotation of the blades is stopped by an external force,
wherein the cap structure includes a surface facing toward the propeller, and at least one spiral recess formed in the surface,
wherein the hub includes at least one protrusion slidably engaged in the at least one spiral recess when the propeller is connected to the cap structure,
wherein the propulsion system includes a coupling structure configured to apply a predetermined force to the propeller in the first direction such that the propeller is not separated from the cap structure, and
wherein the coupling structure is composed of a surface, which faces the propeller, of the cap structure, magnets disposed on the surface, and metallic portions disposed at positions corresponding to the magnets on the hub.

5. The propulsion system of claim 4, wherein the at least one protrusion has a first inclined portion rising in the first rotational direction.

6. The propulsion system of claim 5, wherein the at least one spiral recess has a second inclined portion corresponding to the first inclined portion such that the propeller and the cap structure come in close contact with each other when being coupled.

7. The propulsion system of claim 5, wherein the propeller is configured to be slid down toward the motor relative to the cap structure by the first inclined portion when rotation of the blades is stopped and the propeller slides in a second rotational direction relative to the cap structure.

* * * * *